US009004133B2

(12) United States Patent
Cik

(10) Patent No.: US 9,004,133 B2
(45) Date of Patent: Apr. 14, 2015

(54) APPARATUS AND METHOD FOR MAKING A CORRUGATED PRODUCT

(71) Applicant: BJ2, LLC, University Heights, OH (US)

(72) Inventor: Jason Cik, University Heights, OH (US)

(73) Assignee: BJ2, LLC, University Heights, OH (US)

( * ) Notice: Subject to any disclaimer, the term of this patent is extended or adjusted under 35 U.S.C. 154(b) by 0 days.

(21) Appl. No.: 14/041,141

(22) Filed: Sep. 30, 2013

(65) Prior Publication Data

US 2014/0027062 A1     Jan. 30, 2014

Related U.S. Application Data

(62) Division of application No. 13/177,243, filed on Jul. 6, 2011, now Pat. No. 8,580,061.

(60) Provisional application No. 61/493,655, filed on Jun. 6, 2011, provisional application No. 61/411,898, filed on Nov. 9, 2010, provisional application No. 61/362,115, filed on Jul. 7, 2010.

(51) Int. Cl.
*B31F 1/24* (2006.01)
*A47B 96/20* (2006.01)
(Continued)

(52) U.S. Cl.
CPC . *B31F 1/24* (2013.01); *A47B 96/20* (2013.01); *A47B 96/205* (2013.01); *A47C 27/144* (2013.01);
(Continued)

(58) Field of Classification Search
CPC ...... B29C 53/22; B29C 53/28; B29C 66/438; B31F 1/20; B31F 1/24; B31F 1/245
USPC ......... 156/205, 206, 207, 208, 210, 290, 291, 156/292, 462, 459
See application file for complete search history.

(56) References Cited

U.S. PATENT DOCUMENTS 4,202,723 A    5/1980  Chaudhuri
4,288,273 A    9/1981  Butler, Jr. et al.
(Continued)

FOREIGN PATENT DOCUMENTS

GB        2187113      9/1987
WO     WO 96/21378    7/1996

OTHER PUBLICATIONS

International Search Report PCT/US2011/43062 (3 pgs.).
(Continued)

*Primary Examiner* — Philip Tucker
*Assistant Examiner* — John Blades
(74) *Attorney, Agent, or Firm* — Norton Rose Fulbright US LLP; Scott D. Rothenberger

(57) ABSTRACT

The invention describes a device and method for making corrugated products. The device can be used with any substrate and includes, at least, first and second drive rollers for driving a middle substrate and a single wall corrugated product. In other embodiments the invention includes upper drive rollers, lower drive rollers and middle drive rollers for driving an upper substrate, a lower substrate and a middle substrate. The middle substrate is driven between the upper and lower substrates at a higher velocity to form flutes that are anchored between the upper an lower substrates thereby forming a corrugated product. The invention also provides for customized corrugated products having multiple fluted substrates in various desirable arrangements. Examples of such products include mattress, partition panels, other furniture and construction products.

19 Claims, 24 Drawing Sheets

(51) Int. Cl.

| | | |
|---|---|---|
| *A47C 27/14* | (2006.01) | |
| *A47C 31/00* | (2006.01) | |
| *B29C 44/06* | (2006.01) | |
| *B29C 53/28* | (2006.01) | |
| *B29D 24/00* | (2006.01) | |
| *B32B 3/28* | (2006.01) | |
| *B32B 5/18* | (2006.01) | |
| *B32B 23/04* | (2006.01) | |
| *E04C 2/00* | (2006.01) | |
| *E04C 2/34* | (2006.01) | |
| *B29C 65/08* | (2006.01) | |
| *B29C 65/14* | (2006.01) | |
| *B29C 65/16* | (2006.01) | |
| *B29C 65/48* | (2006.01) | |
| *B29C 65/00* | (2006.01) | |
| *B29K 105/04* | (2006.01) | |
| *B32B 37/04* | (2006.01) | |

(52) U.S. Cl.
CPC ............... *A47C 31/001* (2013.01); *B29C 44/06* (2013.01); *B29C 53/28* (2013.01); *B29C 65/08* (2013.01); *B29C 65/1412* (2013.01); *B29C 65/16* (2013.01); *B29C 65/48* (2013.01); *B29C 65/4895* (2013.01); *B29C 66/431* (2013.01); *B29C 66/438* (2013.01); *B29C 66/72521* (2013.01); *B29C 66/727* (2013.01); *B29C 2795/00* (2013.01); *B29D 24/001* (2013.01); *B29K 2105/04* (2013.01); *B32B 3/28* (2013.01); *B32B 5/18* (2013.01); *B32B 23/04* (2013.01); *B32B 37/04* (2013.01); *B32B 2305/022* (2013.01); *B32B 2479/00* (2013.01); *E04C 2/00* (2013.01); *E04C 2/3405* (2013.01); *E04C 2002/3466* (2013.01)

(56) References Cited

U.S. PATENT DOCUMENTS

| | | | |
|---|---|---|---|
| 4,377,545 | A | 3/1983 | Hornbeck |
| 4,452,837 | A | 6/1984 | Clausen et al. |
| 4,551,199 | A | 11/1985 | Weldon |
| 4,580,301 | A | 4/1986 | Ludman et al. |
| 4,631,215 | A | 12/1986 | Welygan et al. |
| 4,713,854 | A | 12/1987 | Graebe |
| 4,716,069 | A | 12/1987 | Burke |
| 4,727,731 | A | 3/1988 | Tough |
| 5,044,027 | A | 9/1991 | Moon |
| 5,488,746 | A | 2/1996 | Hudson |
| 5,558,924 | A | 9/1996 | Chien et al. |
| 5,630,940 | A | 5/1997 | Van Rossen et al. |
| 5,660,778 | A | 8/1997 | Ketcham et al. |
| 5,800,765 | A | 9/1998 | Bradt |
| 5,804,295 | A | 9/1998 | Braun et al. |
| 6,143,410 | A | 11/2000 | Bradt |
| 6,153,037 | A | 11/2000 | Kim et al. |
| 6,955,668 | B2 | 10/2005 | Almberg et al. |
| 7,424,761 | B1 | 9/2008 | Graebe |
| 2005/0095936 | A1 | 5/2005 | Jones et al. |
| 2005/0245164 | A1 | 11/2005 | Aneja et al. |
| 2008/0308215 | A1 | 12/2008 | Kraus et al. |
| 2010/0064491 | A1* | 3/2010 | Dumas et al. .................. 28/100 |

OTHER PUBLICATIONS

International Search Report PCT/US2011/43068 (3 pgs.).

* cited by examiner

APPARATUS AND METHOD FOR MAKING A CORRUGATED PRODUCT

CROSS REFERENCE TO RELATED APPLICATIONS

This application is a Divisional of U.S. application Ser. No. 13/177,243, filed Jul. 6, 2011, now U.S. Pat. No. 8,580,061, which claims benefit under 35 U.S.C. §119(e) to U.S. Provisional Patent Application Ser. Nos. 61/362,115, filed Jul. 7, 2010, and 61/411,898, filed Nov. 9, 2010 and 61/493,655, filed Jun. 6, 2011, the contents of which are incorporated herein by reference in their entirety.

FIELD OF THE INVENTION

The invention relates generally to a process and an apparatus to fabricate a corrugated material.

BACKGROUND OF THE INVENTION

Corrugated materials are extremely useful because of their inexpensive cost and high strength compared to weight and their ability to be formed into finished materials ranging from boxes, spacers, structural elements etc. However, while corrugated cardboard is extremely useful it has several disadvantages. First, the appearance of the cardboard can be less then desirable. Second, the surface is rough and rigid and is prone to wrinkling Third, while corrugated cardboard is relatively strong for its weight, it still lacks the needed support for heavy jobs tending to bend and pucker when placed under sideways pressure. Fourth, corrugated paper materials have little water resistance turn pulpy after exposure to moisture, whether ambient or direct.

Current technology used to corrugate includes the following process. In order to mold a medium into the required waveform, typically the medium gets pressed between two rollers that resemble wide gears. The teeth of the gears fit tightly together. When the medium is fed between the two rollers, the grooves force the medium into the desired waveform forming flutes. The frequency and amplitude of the waveform are determined by the frequency of grooves on the rollers and the depth of those grooves. Glue is often used to bond the corrugated layer to the flat layers. A different corrugating process is often used to corrugate metal and plastic sheeting where the flutes are oriented parallel to the direction of the material travel. The flutes are forced into the material by staggered rollers on the top and bottom of the material. Thus, corrugation of different substrates requires different types of technologies tailored to each substrate.

The limitations of the conventional corrugation process include: (1) The frequency and amplitude of the resulting wave are not easily adjustable, and certainly not in real time. This is because the exact frequency and amplitude of the wave are determined by the dimensions of the rollers used. In order to make any changes, the rollers must be swapped with a different set of rollers. This requires down time during the changeover. (2) Sets of rollers are expensive, therefore manufacturers typically have a limited number of them. This limits production to a set number of discrete frequencies and amplitudes. (3) This conventional method is well suited for smaller corrugations which have an amplitude in the range of $1/8^{th}$ to $1/4"$. However, it becomes more difficult for larger corrugations in the range of 1" up to several feet. Corrugation of larger amplitudes would require rollers that would be so big that it would be cost prohibitive. (4) The conventional method is well suited only for materials that will hold their shape after being molded by corrugating rollers. Typically paper must be heated and steam treated before corrugation so that it will hold its shape well. Materials with a low plasticity and high memory such as rubber or certain plastics may not hold their shape after going through corrugating rollers and therefore would be difficult to corrugate using conventional methods.

Therefore, a need exists for an apparatus and process that provides corrugated material that overcomes one or more of the current disadvantages noted above.

BRIEF SUMMARY OF THE INVENTION

The present invention surprisingly provides an apparatus and process for making a corrugated material that has improved strength and resistance to pressure from all directions, can be resistant to water and can be adapted to have more pleasing aesthetic appearance while at the same time providing greater ease of manufacture, more energy efficiency and the use and production of less toxic chemicals. The invention describes a device and method for making corrugated products. The device can be used with any substrate and includes upper and lower drive rollers for driving an upper and lower substrate and middle drive rollers for driving a middle substrate. When the middle substrate is driven between the upper and lower substrates to form flutes that are anchored between the upper and lower substrates to form a corrugated product of the three layers.

In one embodiment the invention provides, A method to prepare a corrugated product, comprising the steps of: providing an upper and a lower substrate at a rate of $V_1$ and $V_2$ wherein the upper and lower substrates are maintained at a distance $S_1$ from each other; and providing a middle substrate, interposed between the upper substrate and the lower substrate, at a rate of $V_3$, at a trajectory to impact the upper or lower substrates, wherein the rate $V_3$ is greater than the rates of $V_1$, and $V_2$ such that the middle substrate forms flutes alternately contacting the upper and lower substrates; wherein a corrugated product is formed. In the exemplary embodiments, $V_1$ and $V_2$ will be the same. However, in various exemplary embodiments of the invention, $V_1$ and $V_2$ may differ from each other.

In yet another embodiment, an apparatus is provided to prepare a corrugated product. The apparatus includes:

a first pair of drive rollers to drive a middle substrate through the feed guide and actuated to have a velocity $V_3$;

a form guide positioned after the first pair of drive rollers; wherein the form guide provides an upper surface to guide an upper substrate and a lower surface to guide a lower substrate;

a second pair of drive rollers actuated to have a velocity $V_1$, wherein $V_3$ is greater than $V_1$;

a bonding device positioned about the upper surface and the lower surface of the form guide, wherein the bonding device attaches the middle substrate to the upper and lower substrates; wherein a corrugated product is prepared.

The invention provides yet another exemplary embodiment of an apparatus is to prepare a corrugated product comprising:

a first pair of drive rollers to feed a middle substrate at a rate $V_3$;

a form guide, positioned to accept the middle substrate from the first pair of drive rollers, the form guide comprising an upper and a lower surface separated by a distance $S_1$, wherein the form guide accepts an upper substrate on its upper surface and a lower substrate on its lower surface;

a bonding device positioned about the upper surface and the lower surface of the form guide, wherein the bonding device attaches flutes of the middle substrate to the upper and lower substrates to provide a corrugated product;

a second pair of drive rollers positioned after the form guide and pulls the corrugated product through the apparatus; wherein a corrugated article is produced.

In this embodiment, the form guide is a set of substantially parallel plates, parallel rollers or combinations thereof. In still other aspects, the apparatus according to the invention, a feed guide is provided to accept the middle substrate from the drive rollers and feed the middle substrate into the form guide. In some embodiments, the feed guide comprises two plates separated by a distance that can be varied to accept the middle substrate.

In still another embodiment, the invention provides a method of making a corrugated product comprising:

(a) providing an upper substrate and a lower substrate, the upper substrate moving at a velocity $V_1$ and the lower substrate moving at a velocity $V_2$, the upper substrate and the lower substrate being essentially parallel to each other and separated by a distance '$S_1$';

(b) providing a middle substrate, the middle substrate situated between the upper substrate and the lower substrate and moving at a velocity $V_3$, wherein $V_3$ is greater than $V_1$ or $V_2$;

(c) propelling the middle substrate at a trajectory to contact the upper substrate or the lower substrate, wherein upon contact with the upper substrate or the lower substrate, the middle substrate rebounds in an opposite direction to contact the opposing substrate, wherein, upon contact with the opposing substrate, the middle substrate rebounds to contact the other substrate; and (d) attaching the point of contact of the middle substrate with the upper substrate and the lower substrate such that the middle substrate forms flutes between the upper substrate and the lower substrate;

wherein a corrugated product is provided.

In still another embodiment, the invention provides a corrugated foam mattress comprising a first corrugated product, the first corrugated product including:

an upper substrate;
a middle substrate;
a lower substrate;
two side perimeter pieces; and
two end perimeter pieces;

wherein the middle substrate is fluted and the flutes are fixed to the upper and lower substrates to form a single wall corrugated product; and wherein the two side pieces are fixed to the sides of the corrugated product and the two end pieces are fixed to the ends of the foam product to enclose the interior of the mattress.

In some exemplary embodiments, the mattress further provides a second corrugated product adhered to the top or bottom substrate wherein the second corrugated product comprises a second upper substrate, a second lower substrate and a second middle substrate corrugated between the second upper and lower substrates and two side perimeter pieces and two end perimeter pieces.

In yet another embodiment, the invention provides a method of making a foam mattress comprising a first corrugated product including:

preparing a single wall foam corrugated product having an upper substrate, a middle substrate and a lower substrate;

wherein the middle substrate is fluted and the flutes of the middle substrate are attached to the upper and lower substrates; and attaching foam perimeter pieces around the outside of the single wall corrugated product to make a foam mattress.

In various exemplary embodiments, the method of making a mattress further includes: a second corrugated product adhered to the top or bottom substrate wherein the second corrugated product comprises a second upper substrate, a second lower substrate and a second middle substrate corrugated between the second upper and lower substrates and two side perimeter pieces and two end perimeter pieces.

While multiple embodiments are disclosed, still other embodiments of the present invention will become apparent to those skilled in the art from the following detailed description. As will be apparent, the invention is capable of modifications in various obvious aspects, all without departing from the spirit and scope of the present invention. Accordingly, the detailed descriptions are to be regarded as illustrative in nature and not restrictive.

DETAILED DESCRIPTION

Figure 1:
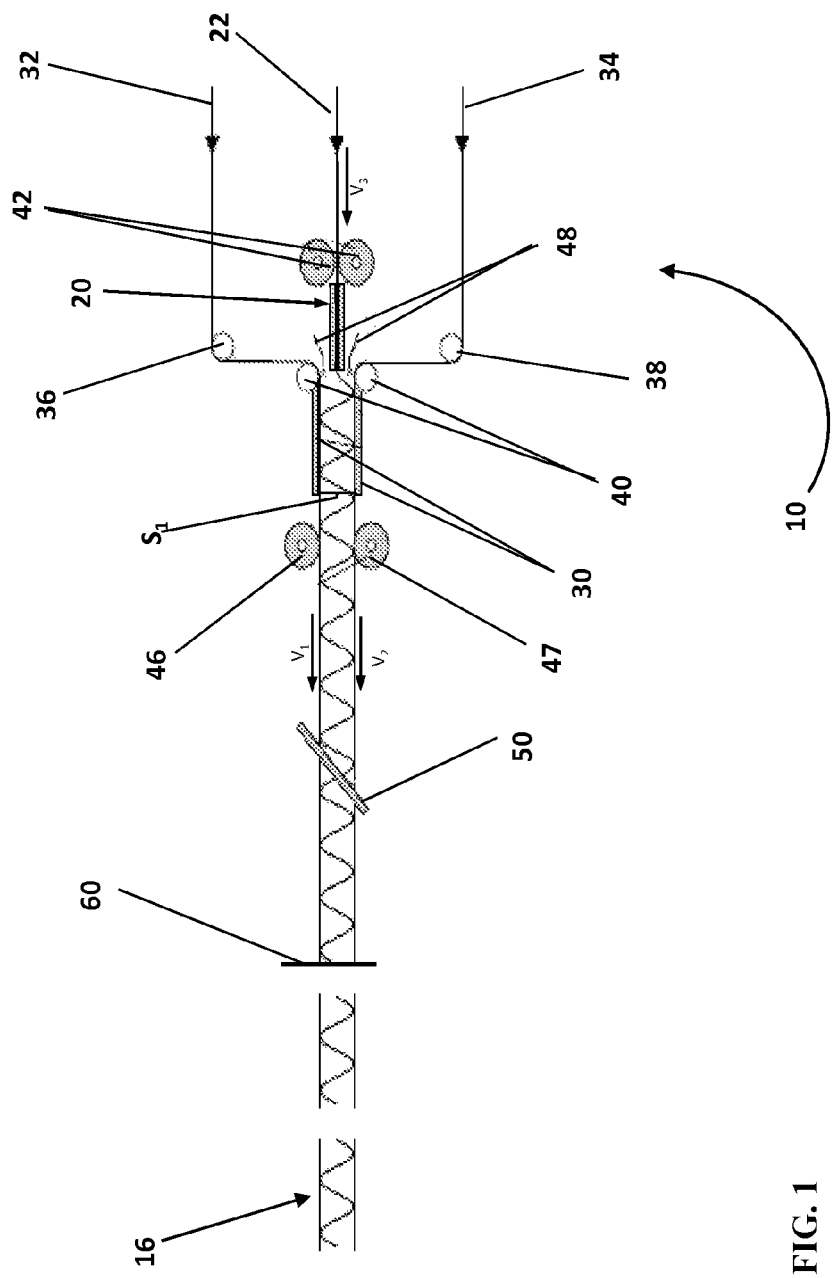
FIG. 1 is a schematic drawing illustrating one exemplary embodiment of a corrugated product apparatus according to the invention.

In the specification and in the claims, the terms "including" and "comprising" are open-ended terms and should be interpreted to mean "including, but not limited to . . . ." These terms encompass the more restrictive terms "consisting essentially of" and "consisting of."

It must be noted that as used herein and in the appended claims, the singular forms "a", "an", and "the" include plural reference unless the context clearly dictates otherwise. As well, the terms "a" (or "an"), "one or more" and "at least one" can be used interchangeably herein. It is also to be noted that the terms "comprising", "including", "characterized by" and "having" can be used interchangeably.

Unless defined otherwise, all technical and scientific terms used herein have the same meanings as commonly understood by one of ordinary skill in the art to which this invention belongs. All publications and patents specifically mentioned herein are incorporated by reference in their entirety for all purposes including describing and disclosing the chemicals, instruments, statistical analyses and methodologies which are reported in the publications which might be used in connection with the invention. All references cited in this specification are to be taken as indicative of the level of skill in the art. Nothing herein is to be construed as an admission that the invention is not entitled to antedate such disclosure by virtue of prior invention.

Traditional corrugated products, such as cardboard and paper are made first, by pulping wood to make a coarse paper called kraft paper. Such pulping and papermaking is a chemical and energy intensive process. In making cardboard, The kraft paper is then softened with high pressure steam. While corrugated products may have multiple layers or substrates, typically there is a layer of "linerboard" on which the corrugated middle "fluted" layer is glued. After the fluted layer is fixed to the first layer of linerboard a second linerboard is glued to the top of the fluted layer. Next the corrugated product is processed by pressurized rollers and subjected to further heat treatment. The finished cardboard product can then be cut to desired sizes. In the production of corrugated paper products, it is necessary to pre-treat the paper prior to the corrugation process. This is because the paper is stiff and does not normally "bend" when flutes are formed as opposed to creasing and folding and thereby losing its strengthening and protective capacity. Therefore, pre-treatment of the paper material by chemical and physical processes including pressure and steam is required to make the corrugated paper product.

In conventional corrugated products a "single face" product refers to corrugation which comprises a single sheet of linerboard with the corrugated middle layer attached only to that face. "Single wall" refers to construction in which the corrugated medium is sandwiched between two faces of linerboard. Double wall corrugation refers a corrugated product having 3 layers of linerboard alternating with two layers of fluted medium. Similarly "triple wall" corrugation would have four layers of linerboard separated by three layers of fluted medium. It should be understood that the instant invention is not limited to a single wall product or any other product but can be optimized to make any type of conventional and non-conventional corrugated product.

The instant invention provides alternative methods for making corrugated products out of various types of media using various substrates. Referring now to FIG. 1, one embodiment of an apparatus for making a single wall corrugated product 16 according to the invention is illustrated. As shown, the apparatus 10 includes a feed guide 20 for feeding a middle substrate 22 of a medium to be corrugated. The apparatus 10 also includes an upper and a lower portion of a form guide 30 for guiding an upper substrate 32 and a lower substrate 34 of medium for the corrugated product 16. As illustrated, middle substrate 22, is fed into the feed guide in between upper substrate 32 and the lower substrate 34. Upper substrate 32 is fed over an upper guide roller 36 and lower substrate 34 is fed over a lower guide roller 38. After passing over the guide rollers 36 and 38 upper substrate 32 and lower substrate 34 are bent toward the middle substrate 22 where they each contact an upper and lower feed rollers 40 which feeds the upper substrate 32 and the lower substrate 34 into the form 30. Further, the apparatus is designed so that the middle substrate 22 is fed into the form 30 equidistant between the first substrate 32 and the second substrate 34.

Middle substrate 22 is fed into a first set of drive rollers 42 at a velocity $V_3$. After passing through the drive rollers 42 middle substrate 22 passes through a feed guide 20 which directs middle substrate 22 to be fed into a space, $S_1$, between upper substrate 32 and lower substrate 34. Distal to the form 30 are an upper drive roller 46 and a lower drive roller 47 which rotate at desired speeds driving substrates 32 and 34 at velocities $V_1$ and $V_2$, respectively. Also shown are heaters 48 which are apposed to the upper and lower substrates 32, 34 as they enter form 30. Those of skill in the art will appreciate that when $V_3$ is greater than $V_1$ and $V_2$, the middle substrate 22 will bend as it contacts the upper or lower substrate 32, 34. When the media (e.g., substrates 22, 32 and/or 34) are meltable, heaters 48 heat the surface of the media such that as middle substrate 22 contacts either the upper substrate 32 or the lower substrate 34 it is fixed or bonded in place such that the entire corrugated sandwich is formed as it passes through the form guides 30.

Of course, those of skill in the art will appreciate that, $V_1$ and $V_2$, generally are equal when driven by drive rollers 47 and 48 that contact the upper 32 and lower 34 substrates after the middle substrate 22 is fixed to the upper and lower substrates 32, 34. However, in alternative embodiments, illustrated in, for example, FIGS. 4 and 7, the drive rollers 62 and 64 contact the upper 32 and lower 34 substrates respectively before the middle substrate 22 is fixed thereto. As is illustrated, in this embodiment, the faster feed of the upper 32 or lower 34 substrate into the form 56 or 58 results in the entire corrugated product being curved in the direction of the slower moving substrate as shown n FIG. 4.

In addition, it should be understood that the process can be automated by driving the drive rollers with a motor. In some embodiments, when the $V_1$ is equal to $V_2$, drive rollers 46 and 47 and 62 and 64 can be driven together in any conventional manner. For example, a chain on the motor drive shaft can propel sprockets attached to rollers 46 and 47 or 62 and 64 together such that $V_1$ and $V_2$ are equal. In addition, the same motor can drive the middle substrate at a desired velocity $V_3$ by using a different size sprocket such that drive rollers 42 rotate at a higher speed. Of course, those of skill in the art will realize that separate motors can be used to drive each of the drive roller pairs such that the velocity $V_1$, $V_2$ and $V_3$ can be adjusted separately without the need to "gear" each of the drive rollers at a particular ratio. In addition, when multiple motors are used, the relative velocities of $V_1$, $V_2$ and $V_3$ can be adjusted separately in real time so as to vary differently from each other over time during the course of fabrication. In this embodiment, a product such as 16 shown in FIG. 7 can be made by altering the ratio of $V_1$ and $V_2$ in real time as single wall corrugated product 16 is being produced.

Figure 7:
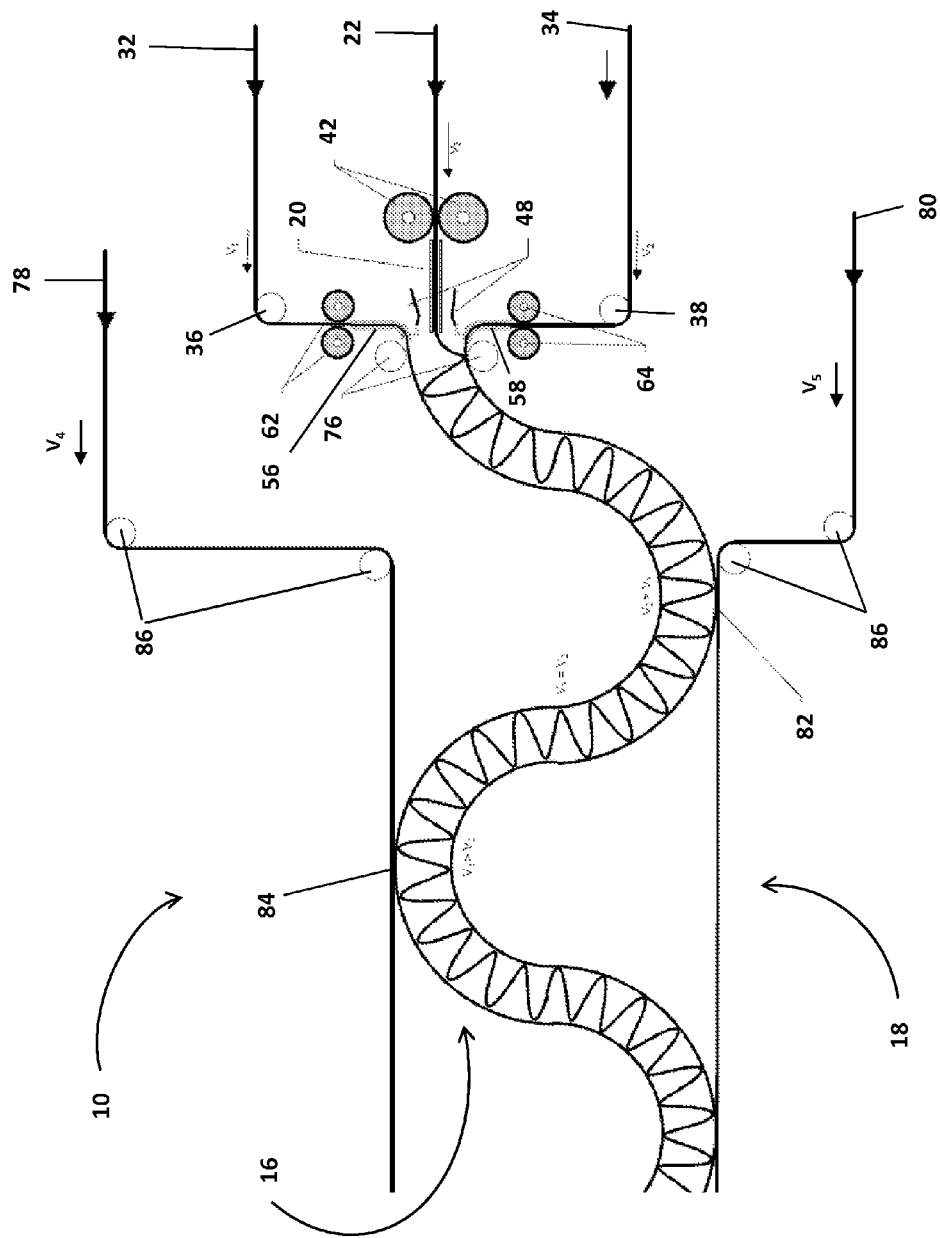
FIG. 7 is a schematic diagram of one embodiment of the invention used for making a double corrugated product. In this embodiment, a fourth and fifth media are used to provide an outer substrate of the corrugated product.
Figure 23:
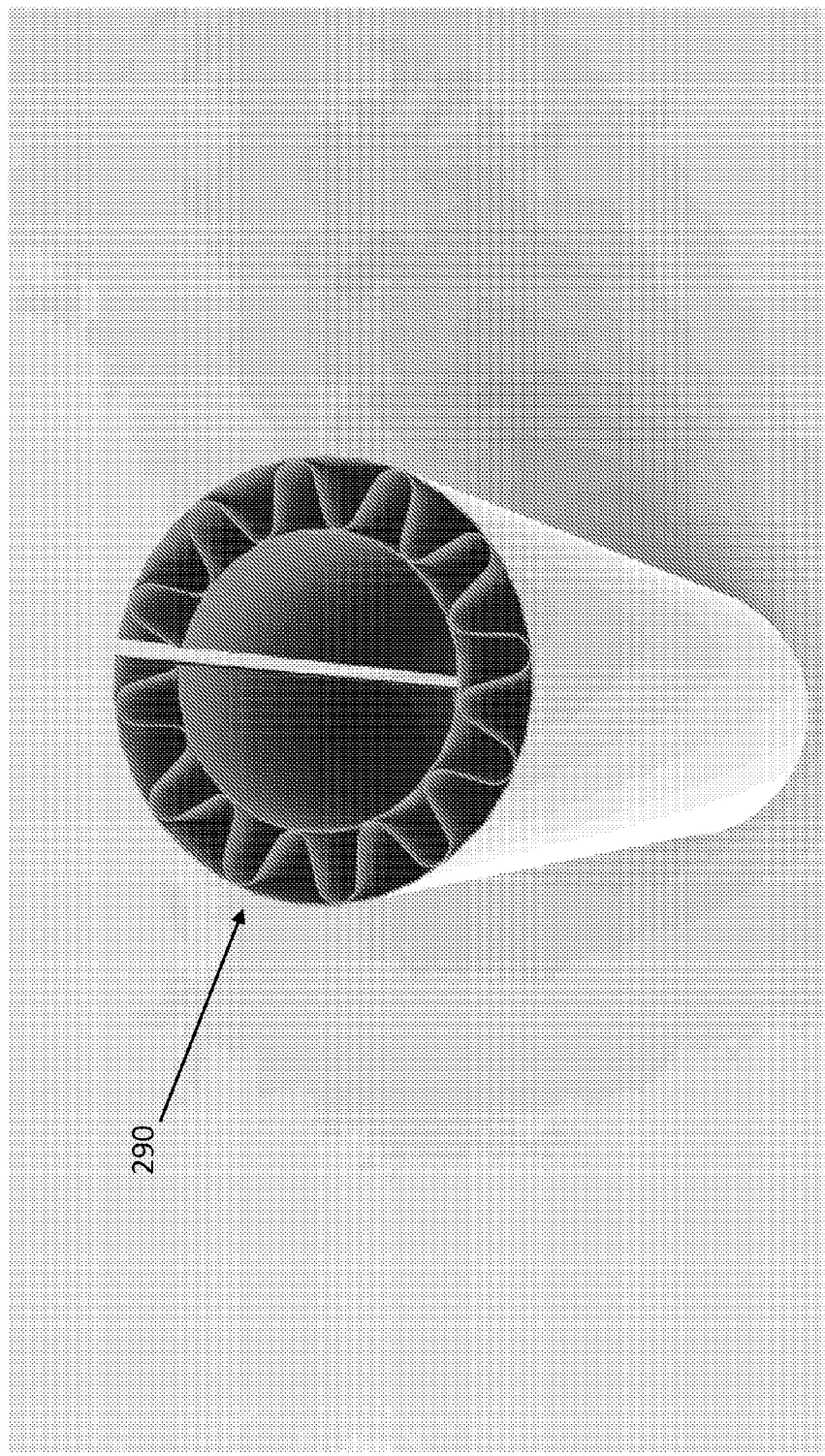
FIG. 23 is a perspective view of a corrugated column made using the corrugation apparatus according to one embodiment of the invention.

Of course, those of skill in the art will appreciate that when $V_1$ and $V_2$ are adjustable in real time, any shaped corrugated product can be made. For example, cylindrical shapes and/or square shapes can be generated. For example, FIG. 23 illustrates a corrugated cylinder made using the instant invention where the ratio of $V_1$ to $V_2$ (or $V_2$ to $V_1$) is constant and always greater, thereby providing a constant curvature with the substrate having the greater V being on the outside and the lesser V being on the inside of the cylinder. Those of skill in the art will appreciate that the motors for each of the drive rollers can be controlled by a programmable computer system such that manual control is not necessary. In addition, it will be appreciated that each of the rollers of a pair of drive rollers must rotate in the opposite direction. For example, as shown in FIG. 7, the upper drive roller of drive roller pair 42 would rotate in the clockwise direction while the lower drive roller would rotate in the counterclockwise direction. Similarly, as shown in FIG. 1 drive roller 46 would rotate clockwise while drive roller 47 rotates counterclockwise.

Those of skill in the art will appreciate that when the fluted, middle substrate 22, is made of a polymer media such as, for example, foam, the substrate is resilient and malleable. Therefore, the substrate 22 bends upon impact with upper substrate 32 and lower substrate and allows for instant bonding of middle substrate 22 to the upper and lower substrates upon impact. Those of skill in the art will appreciate that the rebound of middle substrate 22 upon impact with the upper substrate 32 and due to its malleability, drives the middle substrate in the opposite direction to impact the lower substrate 34 and vice versa. Further, the point of impact of middle substrate 22 onto upper and lower substrates 32 and 34 after exiting feed guide 20, affects the shape of the flute and the bonding of the middle substrate 22 to upper and lower substrates 32, 34. Thus, in some embodiments middle substrate 22 may impact upper and lower substrates 32/34 while those substrates are still in contact with form rollers 40. In this respect, the instant invention provides much greater utility compared to conventional corrugation techniques because with paper, the middle substrate is first treated and then pressed into the desired shape using grooved rollers. Once removed from the rollers, the fluted paper is then glued to the opposing linerboards.

In various exemplary embodiments, the invention further comprises trimming blades 50 that finish the sides of the corrugated product to a smooth and even edge. In various other exemplary embodiments, also included in the invention is a cutting apparatus 60 that cuts the corrugated product to desired length.

However, those of skill in the art will appreciate that trimming blades 50 do not need to be located after the end of the apparatus. In various embodiments, the cutting blades 50 do not need to trim all 3 layers at one time. Those of skill in the art will appreciate that, in various embodiments, it may be desirable to trim each substrate layer to a different width. In these embodiments, there would need to be three separate trimming blades. According to these embodiments, multiple blades could be located anywhere along the corrugation process feasible. Further, when multiple trimming blades are used, they could be distributed at different places along the process. For example, the middle substrate 22 could be trimmed before it enters form 20, whereas outer substrates 32 and 34 could be trimmer after the form but before drive rollers 46 and 47.

Figure 2:
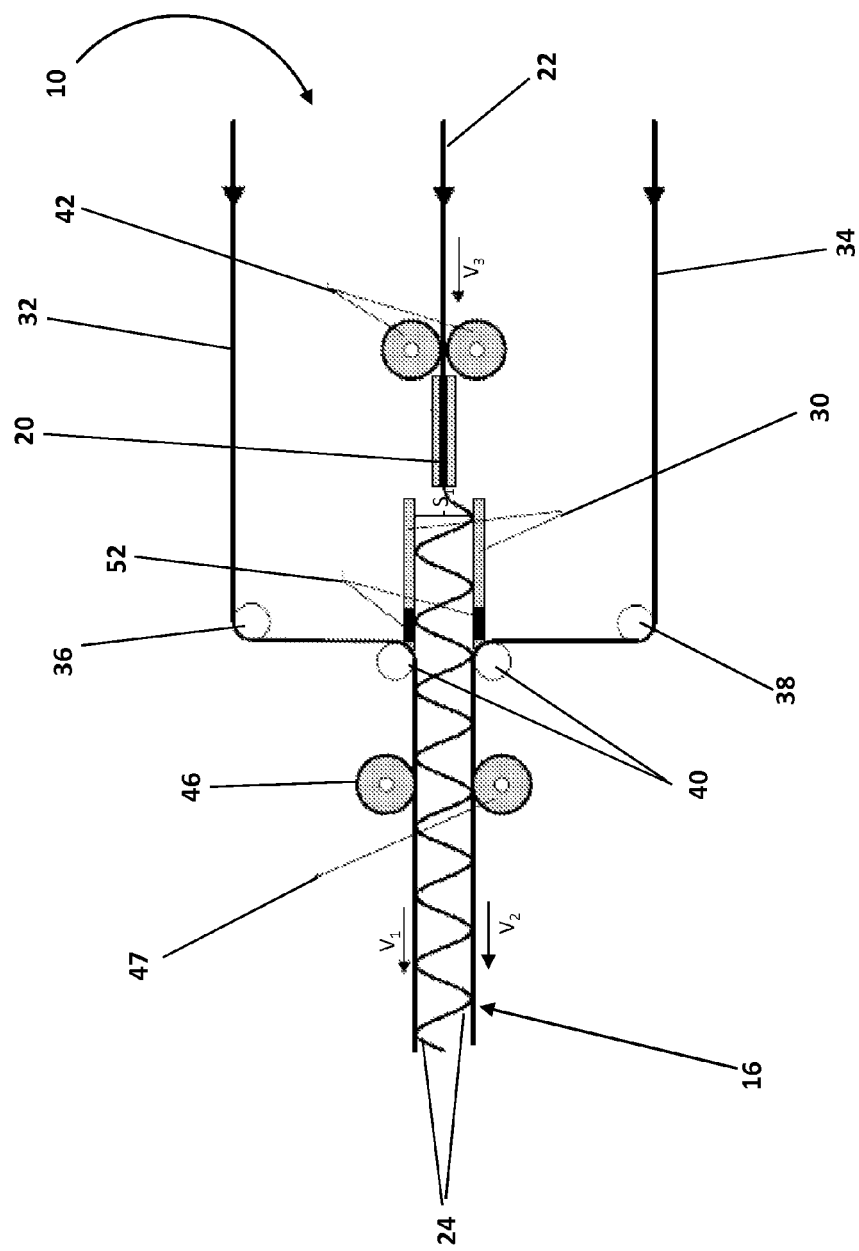
FIG. 2 is a schematic diagram illustrating a second exemplary embodiment of the invention wherein adhesives are use to affix the flutes the to the upper and lower substrate.

FIG. 2 illustrates another exemplary embodiment of an apparatus used to make corrugated products 10 according to the invention. In the embodiment shown, the general design is the same as shown in FIG. 1, however, FIG. 2 illustrates that, in this embodiment, the fixing of the flutes 24 to the upper and lower substrates 32 and 34 is achieved by use of an adhesive 52 which is applied to the apex of each flute 24 bonding it to the upper and lower substrate 32 and 34 and resulting in a single walled corrugated product 16.

Figure 3:
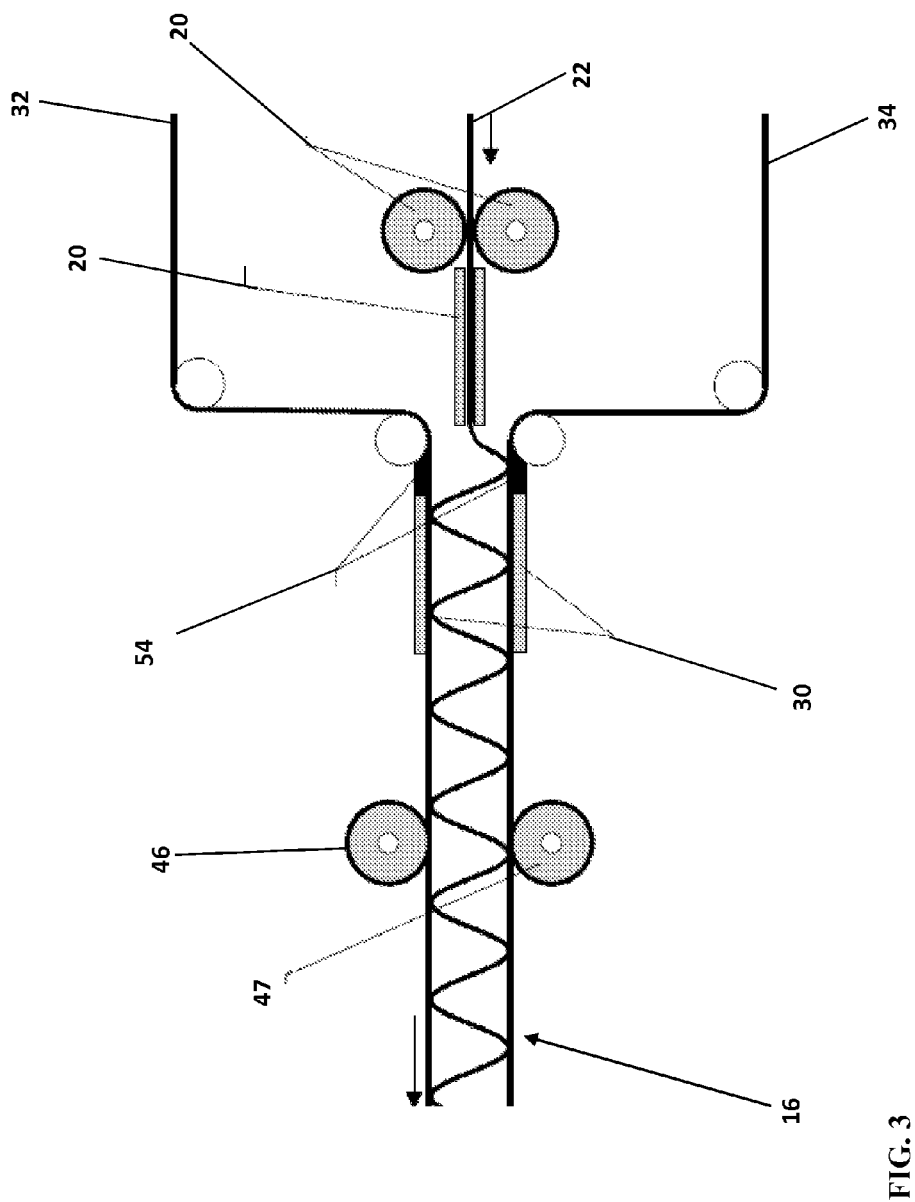
FIG. 3 is a schematic diagram illustrating a third exemplary embodiment of the invention wherein ultrasonic welding is used to affix the flutes to the upper and lower substrates.

FIG. 3 illustrates another exemplary embodiment of the invention wherein the flutes are bonded to the upper and lower substrates 32 and 34 using an ultrasonic welder 54. Ultrasonic welders 54 can be embedded into the form itself (FIG. 3). This will be most applicable when the media comprising the substrates being bonded are either metal or polymer films.

It should be understood that the drive rollers shown in FIGS. 1 through 3 can be substituted with any other mechanical means of driving the substrates such as, but not limited to, a conveyer belt, caterpillar tracks, etc.

In an alternative embodiment of the invention, instead of feeding substrates 32 and 34 into form 30, synchronously with middle substrate 22, the upper and lower substrates 32 and 34 can be fed into the apparatus 10 at the end of form 20 after substrate 22 has been corrugated and gone through the form 20 (noted in FIGS. 2 and 3). Substrate 22 will hold its corrugated shape until it exits form 20 as long as the flutes slide along the inside walls of form 20. One advantage to this method is that an adhesive or solvent can be easily applied to the crests of the wave via the inside of form 20 as illustrated at 52 (FIG. 2).

It should also be understood that each flute can be bonded either as one continuous bond along the entire width of the wave, or it can be spot welded. For example, in these embodiments several spot welds on the top and the bottom of the fluted layer, for example, 4 on the top and 4 on the bottom are generally sufficient depending on the width of the substrates and the material properties of the substrate. However, those of skill in the art will recognize that width can vary from almost zero (which would be a wire) all the way up to a theoretical limit of the width of the substrate available. In various exemplary embodiments, most applications will be in the range of 12" to 96". However, it should be appreciated that any limitation regarding the width of the substrates results solely from the widths the raw materials are available in. The ability to easily cut the foam sheets to any desirable size, either before or after corrugation adds to the utility of the invention.

Those of skill in the art will appreciate that the instant invention can be used to make corrugated products out of many different types of media or substrates. For example, while the media can be cardboard or paper, the media can also be polymer products. Such polymer products can be in the form of foam products. Such foam products can be made of polyethylene and/or polylactic acid foamed products such as that commercially available from, for example iVEX Protective Packaging Inc, Bridgeview, Ill.; Sealed Air, Elmwood Park, N.J. Other media usable for corrugated products includes plastic films such as polypropylene and metals such as steel, aluminum or the like. Therefore, it should be appreciated that in various embodiments, suitable materials for the upper substrate, lower substrate and/or the corrugated product include poly(lactide-co-glycolide) (PLGA), polylactide (PLA), polyglycolide (PGA), D-lactide, D, L-lactide, L-lactide, D, L-lactide-epsilon-caprolactone, D, L-lactide-glycolide-epsilon-caprolactone, polyepsilon-caprolactone, glycolide-caprolactone or combinations thereof.

Other non-biodegradable polymers useful in the present invention include, but are not limited to, various cellulose derivatives (carboxymethyl cellulose, cellulose acetate, cellulose acetate propionate, ethyl cellulose, hydroxypropyl methyl cellulose, hydroxyalkyl methyl celluloses, and alkyl celluloses), silicon and silicon-based polymers (such as polydimethylsiloxane), polyethylene-co-(vinyl acetate), poloxamer, polyvinylpyrrolidone, poloxamine, polypropylene, polyamide, polyacetal, polyester, poly ethylene-chlorotrifluoroethylene, polytetrafluoroethylene (PTFE or "Teflon™"), styrene butadiene rubber, polyethylene, polypropylene, polyphenylene oxide-polystyrene, poly-alpha-chloro-p-xylene, polymethylpentene, polysulfone, non-degradable ethylene-vinyl acetate (e.g., ethylene vinyl acetate disks and poly(ethylene-co-vinyl acetate)), methacrylates, poly(N-isopropylacrylamide), and other related polymers.

Additional polymers can also include, but are not limited to, delrin, polyurethane, copolymers of silicone and polyurethane, polyolefins (such as polyisobutylene and polyisoprene), acrylamides (such as polyacrylic acid and poly(acrylonitrile-acrylic acid)), neoprene, nitrile, acrylates (such as polyacrylates, poly(2-hydroxy ethyl methacrylate), methacrylates, methyl methacrylate, 2-hydroxyethyl methacrylate, and copolymers of acrylates with N-vinyl pyrrolidone), N-vinyl lactams, polyacrylonitrile, glucomannan gel, vulcanized rubber, poly(3-hydroxybutyrate) and combinations thereof. Examples of polyurethanes include thermoplastic polyurethanes, aliphatic polyurethanes, segmented polyurethanes, hydrophilic polyurethanes, polyether-urethane, polycarbonate-urethane and silicone polyether-urethane.

Other suitable materials include, but are not limited to, lightly or highly cross-linked biocompatible homopolymers and copolymers of hydrophilic monomers such as 2-hydroxyalkyl acrylates and methacrylates, N-vinyl monomers, and ethylenically unsaturated acids and bases; polycyanoacrylate, polyethylene oxide-polypropylene glycol block copolymers, polygalacturonic acid, polyvinyl pyrrolidone, polyvinyl acetate, polyalkylene glycols, polyethylene oxide, collagen, sulfonated polymers, vinyl ether monomers or polymers, alginate, polyvinyl amines, polyvinyl pyridine, and polyvinyl imidazole.

In one aspect, closed cell low density polyethylene(LDPE) foam is used for the upper substrate, lower substrate and corrugated substrate. In use, the corrugated articles made using the present invention could use any size substrate as long as it is flexible. Thus, the width, height and thickness of the substrate may vary depending on the desired use of the corrugated product. For example, stiffer more structural corrugated products may require thinner stiffer substrates as thin as about 1/16 inch while product used in furniture manufacture, e.g., cushions and mattresses may require thicker substrates such as about 1/2 inch thick, but can be from about 1/8" to about 1 inch thick. Closed cell polyethylene foam has a good balance between rigidity and memory (meaning it will return to its original shape after bending) at a lower density than other foams. This makes it a good support for the corrugated design.

Additionally, closed cell low density polyethylene is advantageous for use in the articles of furniture noted herein as it is non-toxic. Polyethylene has been known to be a safe and stable material. It does not easily degrade or react with its surroundings, even after many years. It does not require any additives, like some other plastics. It will not "outgas" chemicals over its lifetime. This makes polyethylene a unique material for use in a baby product where it is important that there be no chemical leaching into the baby's environment. Other foams, like polyurethane foam, are made with different materials and can degrade and breakdown much more easily than polyethylene.

Those of skill in the art will appreciate that the stiffness and resilience of the corrugated product made using the instant invention can be modified depending on its desired use. For example, varying the ratios of $V_1$, $V_2$ and $V_3$ allows for greater or lesser periodicity with respect to the flutes of the corrugated substrate. If the ratio of $V_3$ to $V_1$ and $V_2$ is very high there will be an increased number of flutes per lineal foot of the corrugated product. However, if the ratio is low, there will be a decreased number of flutes per lineal foot of the corrugated product. Further, those of skill in the art will appreciate that while $V_1$ and $V_2$ may be the same, it may be desirable to have $V_1$ or $V_2$ faster (or slower) than the other. See, for example FIGS. 4 and 7. Such cases may arise when it is desirable to have non-linear output corrugation.

In addition, varying the space between the substrates allows further optimization of the corrugated product. If the space $S_1$ between the upper and lower substrate is large, the flutes will be large and the corrugated product will have greater elasticity and less stiffness. Conversely, if the space $S_1$ is small the corrugated product will be more stiff and have less elasticity.

Figure 4:
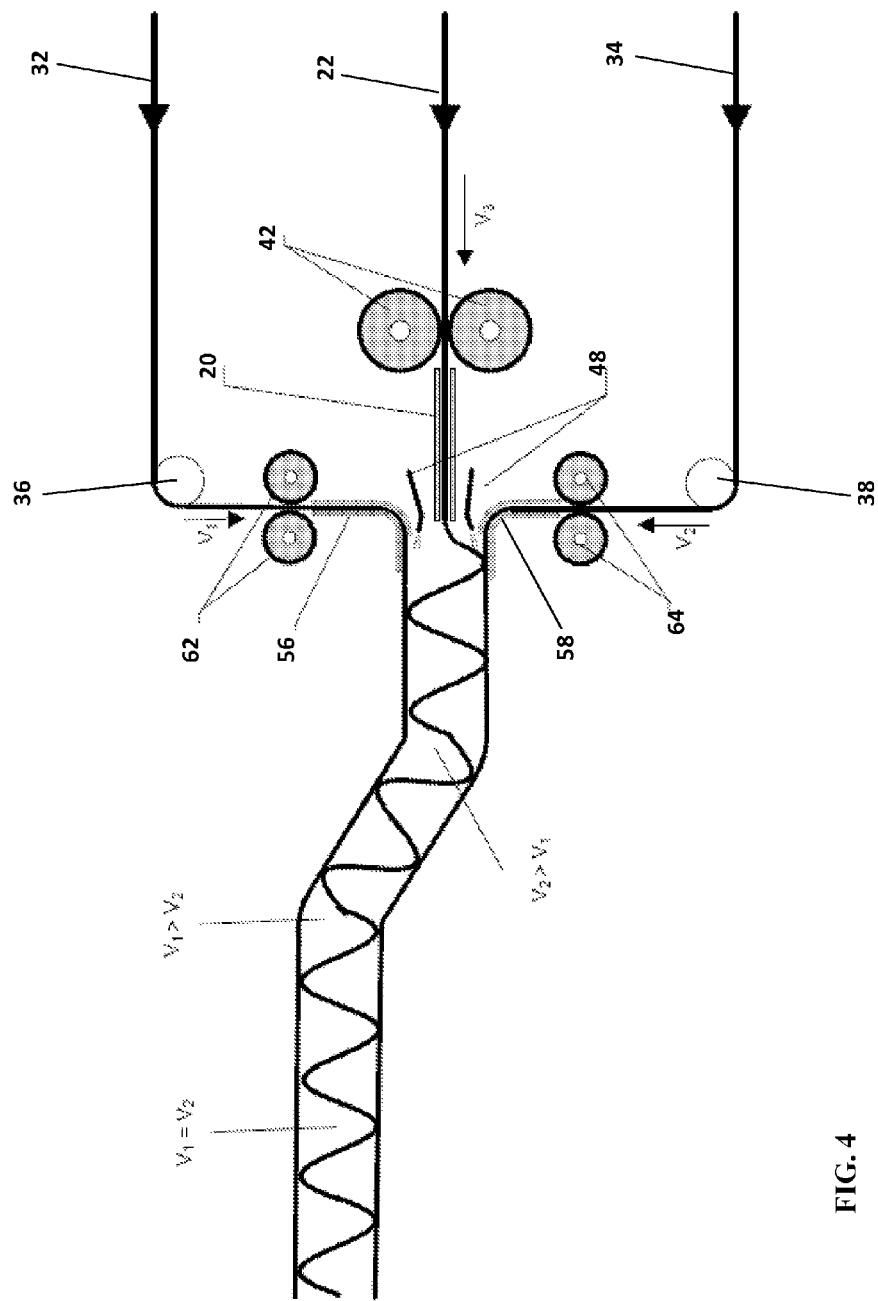
FIG. 4 is a schematic diagram illustrating a fourth exemplary embodiment of the invention where $V_1$ and $V_2$ can differ from each other.

FIG. 4 illustrates one embodiment of the invention where $V_1$ and $V_2$ are different. As shown, in this embodiment, a separate upper drive roller pair 62 and lower drive roller pair 64 are added to apparatus 10 prior to feeding the upper and lower substrates 32 and 34 into separate upper and lower forms 56 and 58. By having separate drive rollers 62 and 64 driving substrates 32 and 34 prior to attaching of the flutes of the middle substrate 22 to the upper and lower substrates 32 and 34, $V_1$ and $V_2$ can differ and the corrugation achieved thereby can be tailored by changing the ratios of $V_1$ to $V_2$ as well as $V_3$ as shown in FIG. 4. Depending on the difference between $V_1$ and $V_2$, the corrugation may be curved or wavy and therefore will not slide through a straight form. Thus, advantageously, the invention provides for a curved corrugation to emerge from the form in a tailored manner.

In addition, when foam is used to make the corrugated product, an outer side of the foam may often be cured so has to provide a hard shell of the outside of the corrugated product. Thus, when the instant invention is used to make corrugated containers, the inside of the container may be foam-like while the outside of the container can have a hard shell.

In other embodiments, the corrugated product according to the invention can be used to make furniture. In these instances, depending on the type of substrate used, the ratio of $V_1/V_2$ to $V_3$ and the distance $S_1$ the strength, plasticity, resiliency and rigidity of the corrugated product can be tailored.

Figure 5:
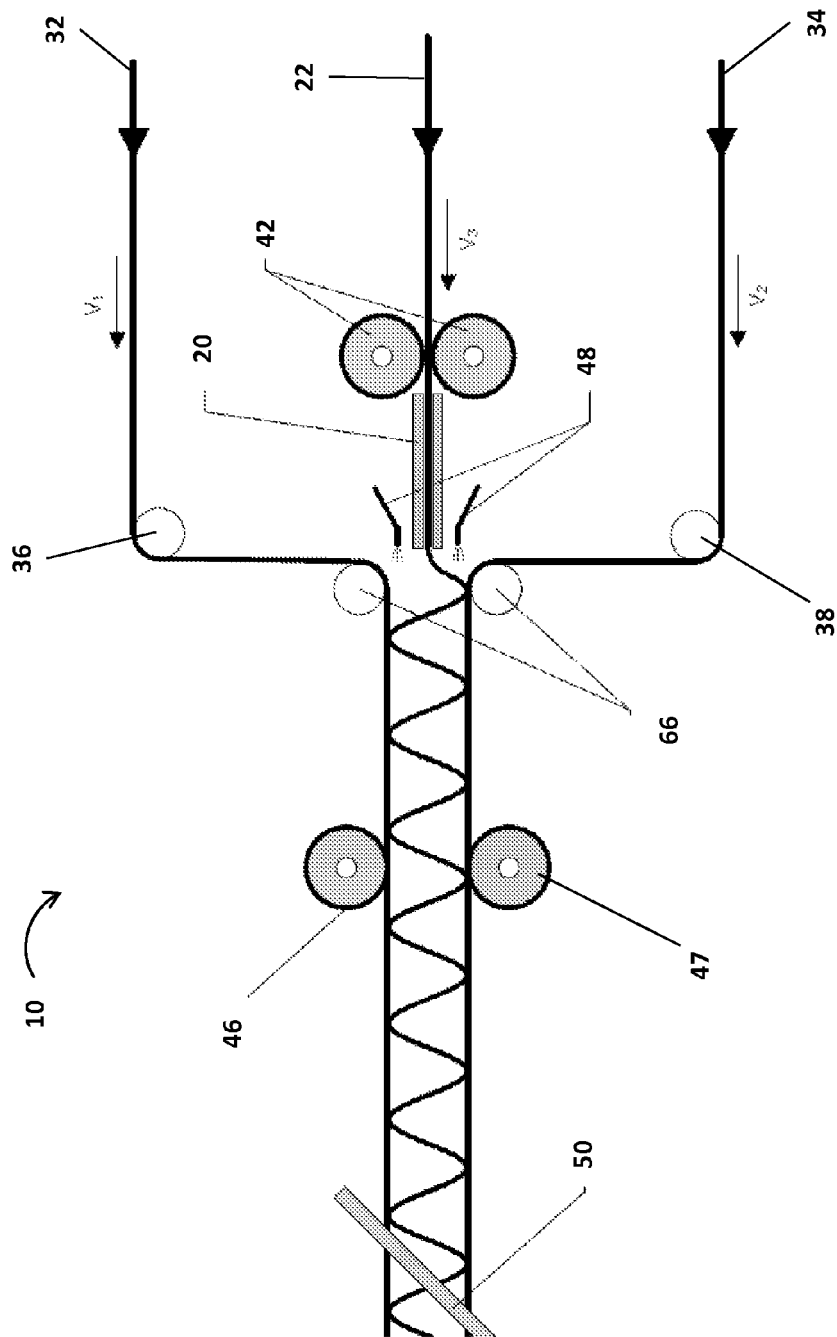
FIG. 5 is a schematic drawing illustrating one embodiment of the apparatus according to the invention having a set of form rollers instead of a form guide as shown in the embodiment illustrated in FIG. 1. In this embodiment, the middle substrate is fed directly into drive rollers.

Other methods of optimizing and/or tailoring the apparatus 10 are contemplated. For example, as shown in FIG. 5, corrugating apparatus 10 may be simplified to omit form guide 30 (shown in FIG. 1) and instead use form rollers 66. In this embodiment, a form guide 30 is not needed as the rollers direct the middle substrate 22 directly to the upper substrate 32 and the lower substrate 34. As with the embodiment illustrated in FIG. 1, in the embodiment illustrated in FIG. 5, $V_3$, is greater than $V_1$ and $V_2$ and $V_1$ and $V_2$ are equal. Also shown are heaters 48. Those of skill in the art will appreciate that, the increased velocity of $V_3$ compared to $V_1$ and $V_2$ will result in middle substrate 22 being alternately and automatically directed to the alternating substrate 32 or 34 due to its recoil from contact with the substrate to which it is bonded by heaters 48. Further, the use of form rollers 66 makes the apparatus 10 simpler providing for easier adjustment of apparatus 10.

Figure 6:
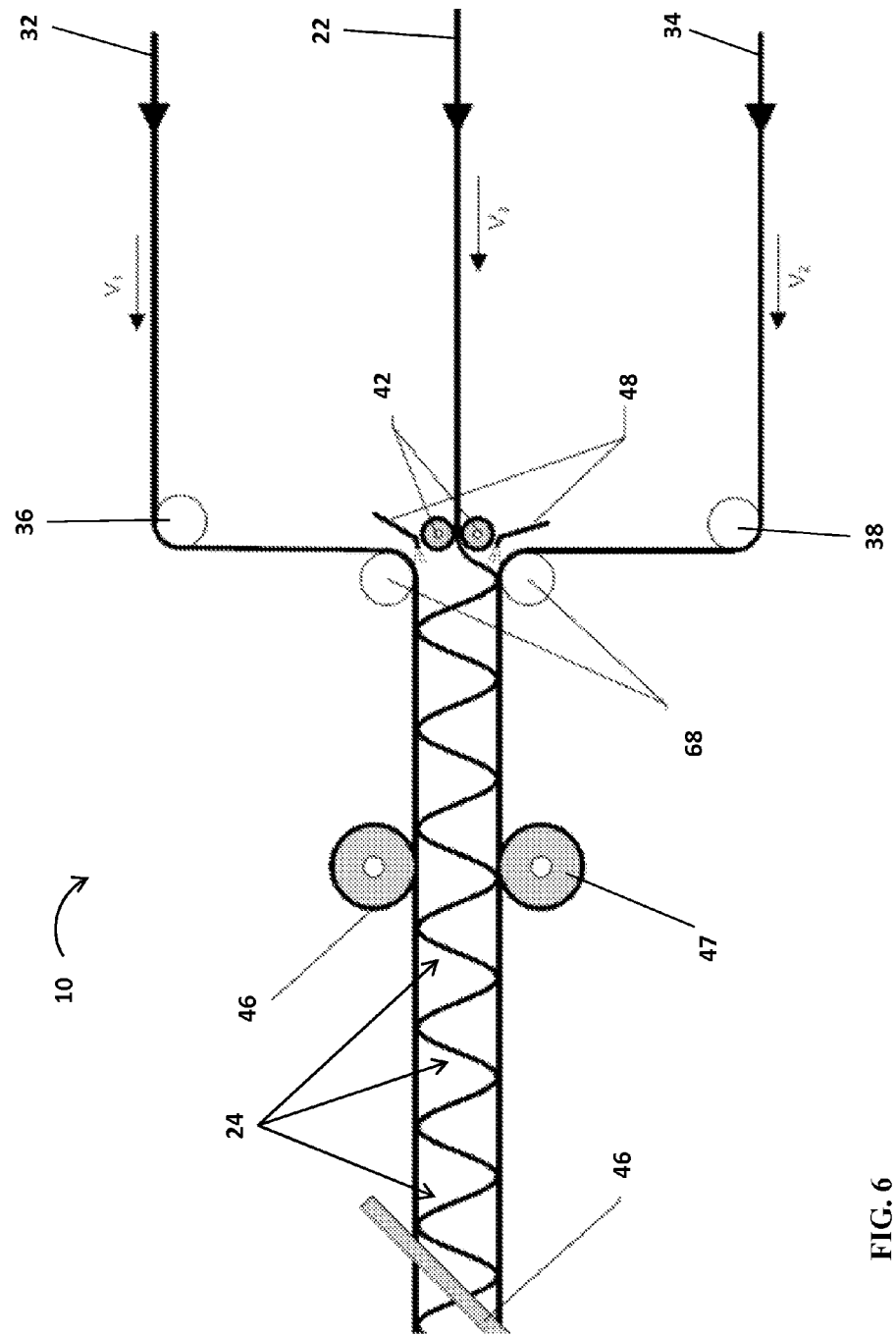
FIG. 6 is a schematic diagram illustrating another exemplary embodiment of the invention wherein the corrugating apparatus includes neither a form guide nor a feed guide.

FIG. 6 is a schematic diagram illustrating another embodiment of the invention which has neither a form guide 30 nor a feed guide 20 as shown in FIGS. 1 and 2. As shown in FIG. 6, drive roller 42 feeds substrate 22 directly to form rollers 68. As with the other embodiments of the invention, the periodicity of flutes 24 depends on the ratio of the velocities of $V_1$ and $V_2$ to $V_3$.

FIG. 7 is a schematic diagram showing one exemplary embodiment of the invention used for making a modified double-walled corrugated product 18. In this embodiment, the corrugating apparatus 10 provides a inner, single walled corrugated product 16 sandwiched in between an upper or fourth substrate 78 and lower or fifth substrate 80. As with the embodiment illustrated in FIG. 4, single walled corrugated product 16 is prepared by providing an upper substrate 32, a lower substrate 34 and a middle substrate 22 in which the velocities $V_1$ and $V_2$ are not equal. In the embodiment shown in FIG. 7, velocities $V_1$ and $V_2$ alternate with respect to their magnitudes with each other. Thus, for example, when $V_1$ is greater than $V_2$, product 16 will be forced downward while when $V_2$ is greater than $V_1$, product 16 will be forced upward. In this embodiment the fourth substrate 78 is propelled by drive rollers (not shown) which propel fourth substrate 78 at velocity $V_4$. Similarly, fifth substrate 80 is also propelled by drive rollers (not shown) at a velocity $V_5$.

In the embodiment shown, $V_4$ and $V_5$ are equal. However, those of skill in the art will appreciate that $V_4$ and $V_5$ may not be equal in which case double walled corrugated product 18 will curve depending on the difference in the velocities of $V_4$ to $V_5$. In the embodiment shown in FIG. 7, single walled corrugated product 16 is made using drive rollers 42 for the middle substrate 34 and upper drive roller pair 62 and lower drive roller pair 64 which propel the upper 32 and lower substrate 34 through upper 56 and lower 58 form feeders respectively and around guide rollers 76. Similarly, fourth substrate 78 and fifth substrate 80 are propelled around guide rollers 86. In addition, in the embodiment shown, upper and lower bonding elements 84 and 82 placed at the location on the fourth 78 and fifth 80 substrate where single walled product 16 contacts the apparatus, thus sealing the single walled corrugated product 16 alternately to the fourth 78 and fifth 80 substrates. Of course, those of skill in the art will appreciate that the bonding elements 78 and 80 can use any desirable method of bonding the single walled product 16 to the fourth 78 and fifth 80 apparatus such as, for example, heating elements, adhesive application, spot welding or the like.

Figure 8:
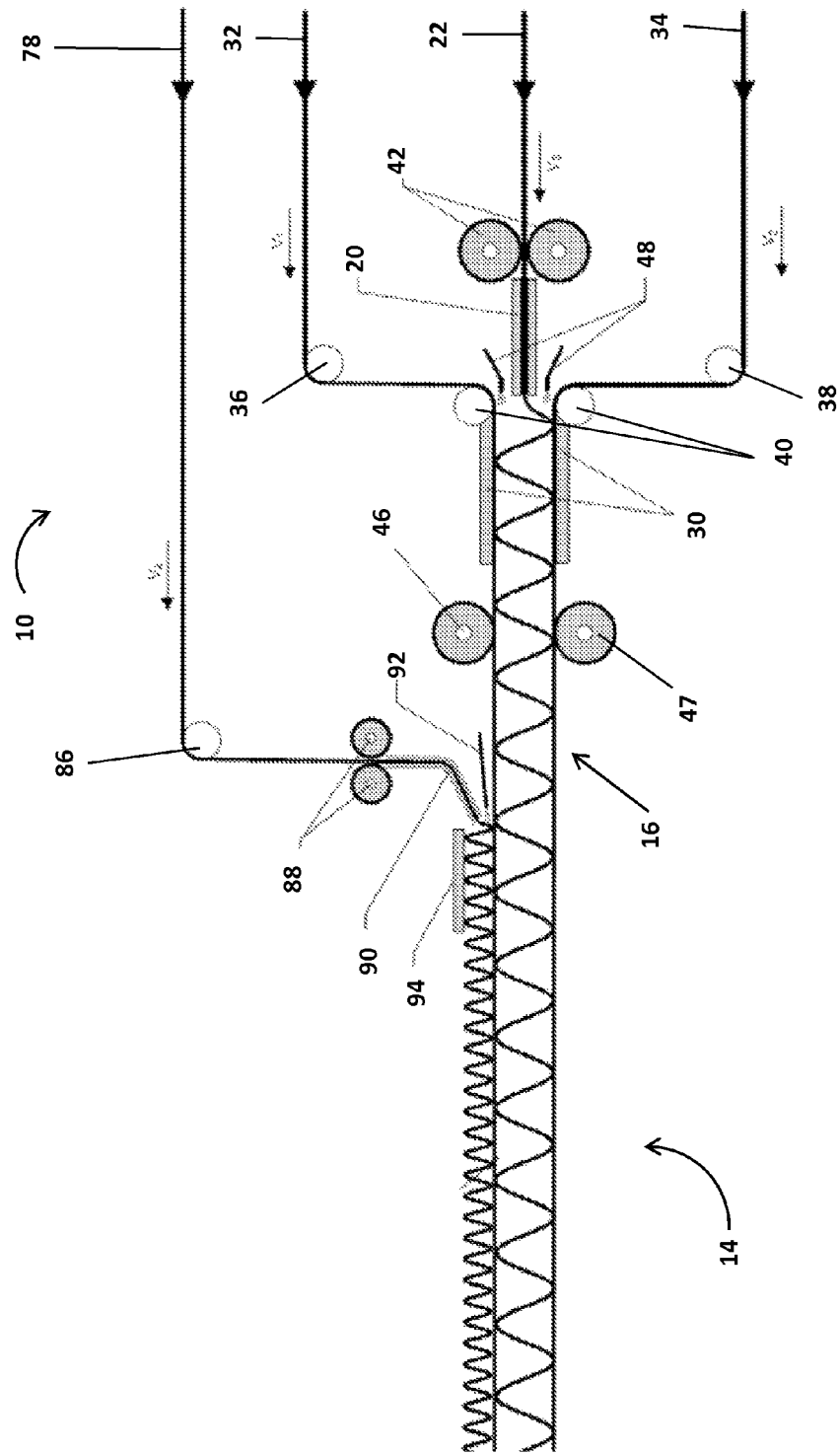
FIG. 8 is a schematic diagram illustrating one embodiment of the invention used for making a double walled corrugation product. In this embodiment, a fourth substrate is used to provide a separate fluted layer to the corrugated product.

FIG. 8 is a schematic diagram representing another exemplary embodiment of the corrugating apparatus 10 according to the invention to make a second modified type of double corrugated product 14. In this embodiment, a single walled corrugated product is made essentially as described previously. However, as with the embodiment illustrated in FIG. 3, once the single walled product exits form guides 30, it is propelled by upper and lower drive rollers 46 and 47 forming a pair which propel product 16 through a path to contact fourth substrate 78. As shown in FIG. 8, fourth substrate 78 follows a path around guide roller 86 and through drive rollers 88 which propel substrate 78 at a velocity $V_4$. Exiting drive rollers 88, substrate 78 is fed into a feed guide 90 at a trajectory to contact double walled product 16 where it is bonded to the upper surface of the product by a bonding element 92 represented in FIG. 8 as a heating element. As illustrated, upon contact with the upper substrate 32 of the single walled product 16, the fourth substrate 78 rebounds to impinge on form guide 94 situated at a desirable distance from upper substrate 32 to provide a desired size and periodicity to provide a single face corrugated surface on top of product 16 to yield product 14.

In the embodiment illustrated in FIG. 8, the single face portion formed by substrate 78 can be a different material depending on the desired use. For example, in the case of cushioning for furniture or a crib mattress, the top fluted layer would be thinner and easier to compress. Its function would be to provide a softer cushion closer to the surface of the article. When used for a mattress, the single walled layer 16 can be used to cushion the upper layer or can be used to add structural strength, or both.

Figures 9A, 9B:
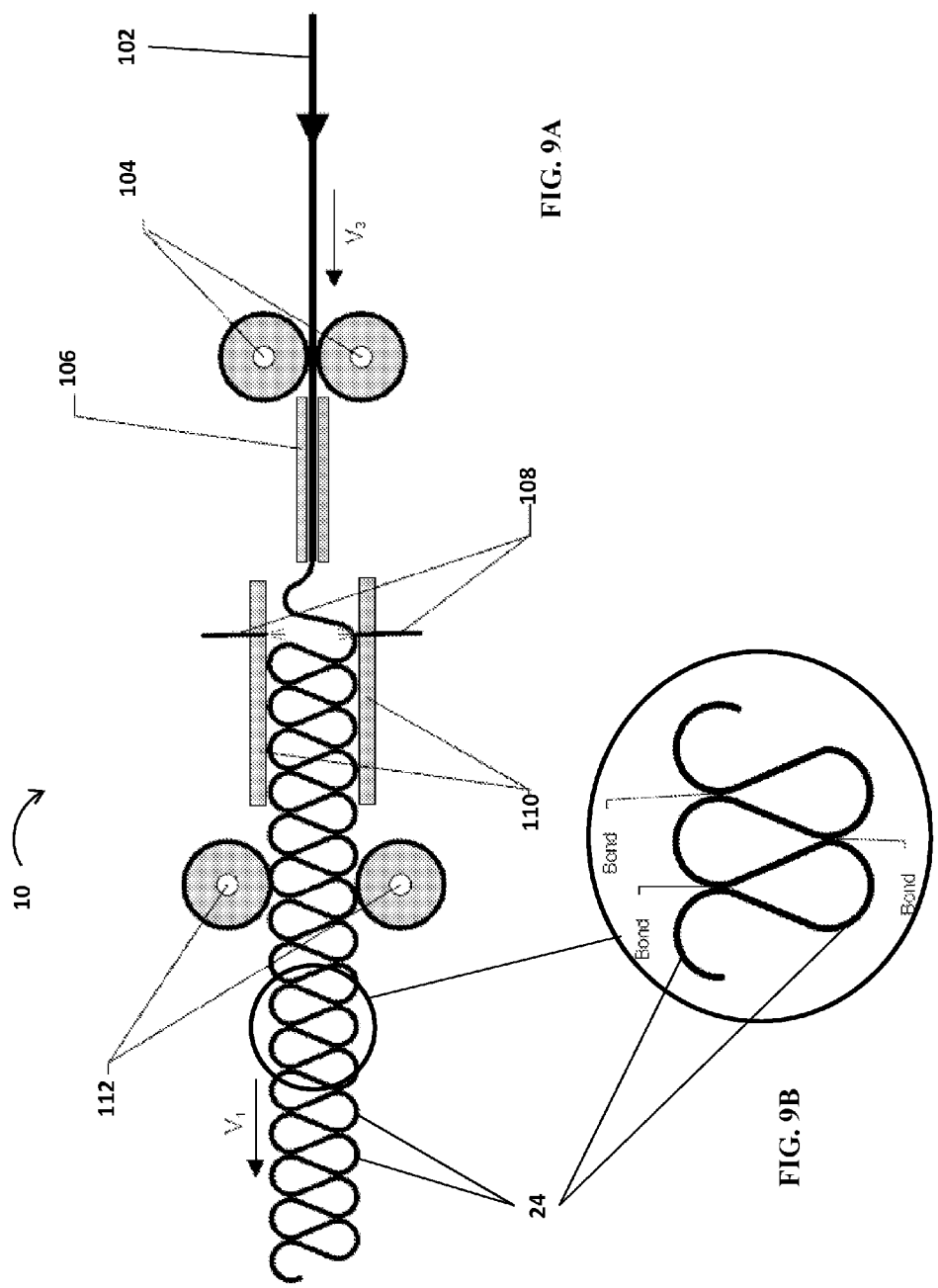
FIG. 9A is a schematic diagram illustrating one embodiment of the invention used for making a single-substrate, corrugated product.
FIG. 9B is an inset of FIG. 9A.

FIG. 9A is a schematic diagram illustrating one embodiment of the invention adapted to produce only the corrugated middle substrate 102. In this embodiment, middle layer 102 is fed into drive rollers 104 propelling substrate 102 at velocity $V_3$ through feed guide 106 whereupon the trajectory of substrate 102 results in substrate 102 contacting either the upper or lower portions of form guide 110. As shown, heaters 108 are situated to heat that portion of the substrate 102 that contacts itself when the flute 24 is formed. The trajectory of substrate 102 is alternately directed to the upper or lower portion of the form guide 110 by the recoil of the substrate 102 as it alternately rebounds from the upper or lower portions of form guide 110. Also illustrated, the fluted substrate 102 is then propelled by a second set of drive rollers 112 to proceed for finishing as desired. FIG. 9B is an inset of FIG. 9A illustrating the fluted substrate 102 formed by bonding the flutes 24 to themselves instead of to an upper and/or lower substrate such as linerboard used in conventional cardboard corrugation techniques.

It should be appreciated that the embodiments of the present invention disclosed in the preceding discussion and FIGS. 1-9 can be combined in different manners as needed. For example, while FIG. 8 illustrates a single wall corrugated product 16 with a single face corrugated product formed on one side, the product 14 could be fabricated to have a single face corrugated product on both sides of product 16. Further, in such a design the size of the single face on an upper and lower sides of product 16 may have different sizes and have different periodicity. Further, throughout the different embodiments of the invention described here, each substrate of the corrugated product may be made from different media depending on the desired uses of the corrugated product. In this embodiment, by forcing the substrate 102 through from 110 at a much faster rate, resulting in a higher input/output speed ration, the crests of the wave (flutes 24) will start to compact on each other until they are touching. The crest of each flute is then bonded to each other at its point of contact as illustrated by heaters 108 (or to other suitable methods such as adhesives) at the point of contact.

The ability to tailor the size, stiffness, thickness and resiliency of the corrugated product made by the instant invention makes it ideal for use in making furniture. In some embodiments the invention comprises the cushioning elements of furniture. For example, often metal and/or wood supports are included in the article to provide strength and support for the individual's needs, such as in an upright or prone position. However, the use of metal in particular, adds to the weight of the article. Often metal components do not always flex to accommodate the individual and can be a source of discomfort after a period of time. For example, bed springs can often be a source of pressure points for an individual and diminishes the therapeutic, restorative and rejuvenating effects of sleep.

Additionally, most furniture articles are manufactured with polymeric materials that can be a source of environmental concern, especially to infants. For example, there are various mattress constructions that use materials that, by themselves or due to some material impurities, can cause or aggravate human allergenic reactions and/or can result in other potentially harmful exposures. For instance, materials that incorporate polyurethanes, polyvinyl chlorides, polystyrenes, or polycarbonates all contain volatiles and/or water soluble chemicals that are potentially harmful to human health, safety, and the environment.

The articles of furniture, such as mattresses, described herein can use polyethylene foam with densities from about 1.2 lbs per cubic foot to about 3.0 lbs per cubic foot. A combination of densities can be used. For example, a material made of 1.2 lbs per cubic foot can be used for the corrugated product, and a material made of 1.7 lbs per cubic foot for the upper and lower substrates in order to give the outer surfaces more rigidity and uniformity.

These low density substrates result in less material used, lower costs, and lighter weight. For example, the finished corrugated product of an infant mattress weighs about 3 lbs, whereas a comparable innerspring weighs 10-12 lbs.

The U.S. Food & Drug Administration (FDA) sets standards for plastic resins used in food packaging to be of greater purity than plastics used for non-food packaging. This is commonly referred to as food grade plastic. Food grade plastics do not contain dyes or recycled plastic deemed harmful to humans.

It has been found that articles of furniture made from food grade low density polyethylene (LDPE) or polylactic acid (PLA) and its copolymers or homopolymers that meet FDA standards offer a very low level of toxicity and can eliminate or reduce adverse human allergenic reactions or other potentially harmful exposures due to the construction materials or their impurities. Even when food grade LDPE or PLA is used for food containers, it is not known to leach any water soluble chemicals that are suspected of causing adverse human allergenic reaction or other potentially harmful exposures.

It is also within the scope of the present invention to use starch sourced Bio-Polymer, Polylactic Acid, or other biopolymer films and laminates to maximize the renewable and recyclable materials content.

It is also within the scope of the present invention to construct an article of furniture using organically grown cotton batting, in order to eliminate any possible agricultural pesticide or chemical fertilizer contamination. This cotton batting can be treated with an ozone or other sanitizing process to clean, oxidize, and to remove other possible contaminant volatiles.

The invention will be further described with reference to the following non-limiting Examples. It will be apparent to those skilled in the art that many changes can be made in the embodiments described without departing from the scope of the present invention. Thus the scope of the present invention should not be limited to the embodiments described in this application, but only by embodiments described by the language of the claims and the equivalents of those embodiments. Unless otherwise indicated, all percentages are by weight.

Figure 10:
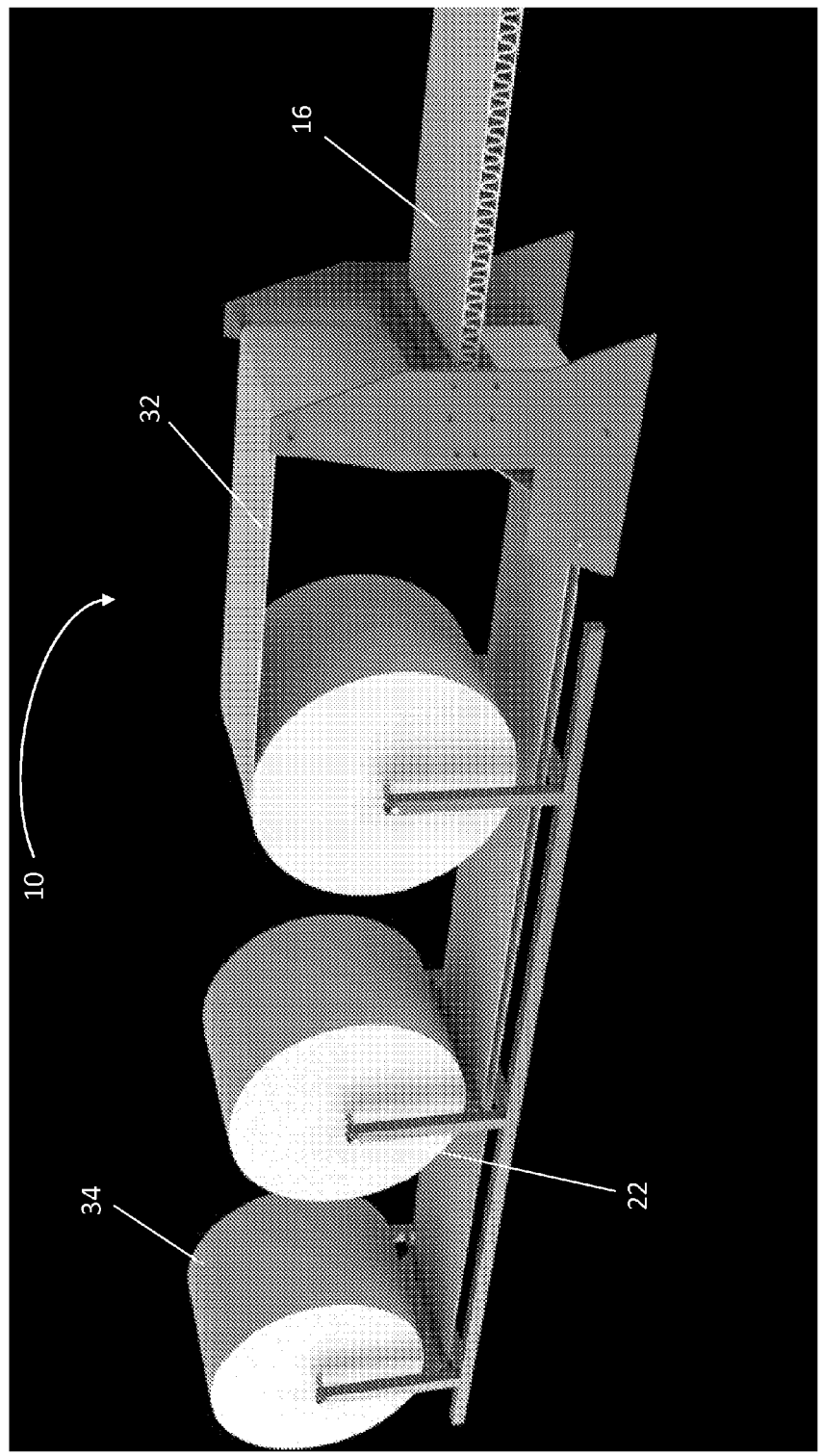
FIG. 10 is a perspective view of a CAD rendering of one embodiment of the corrugation apparatus illustrated in FIGS. 1-9.
Figure 11:
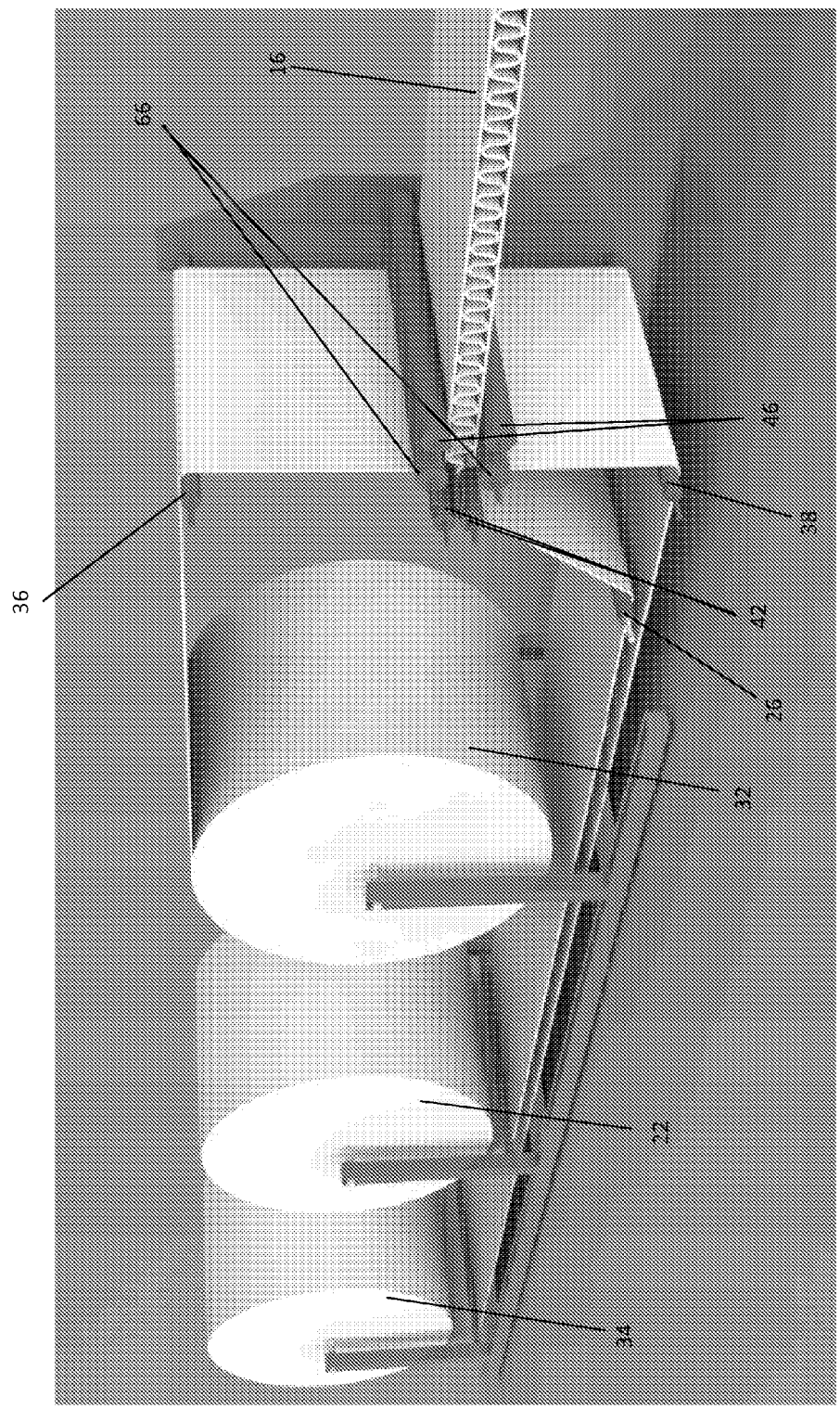
FIG. 11 is a perspective view of the CAD rendering of FIG. 10 wherein one of the support structures has been removed to better illustrated the internal rollers.
Figure 12:
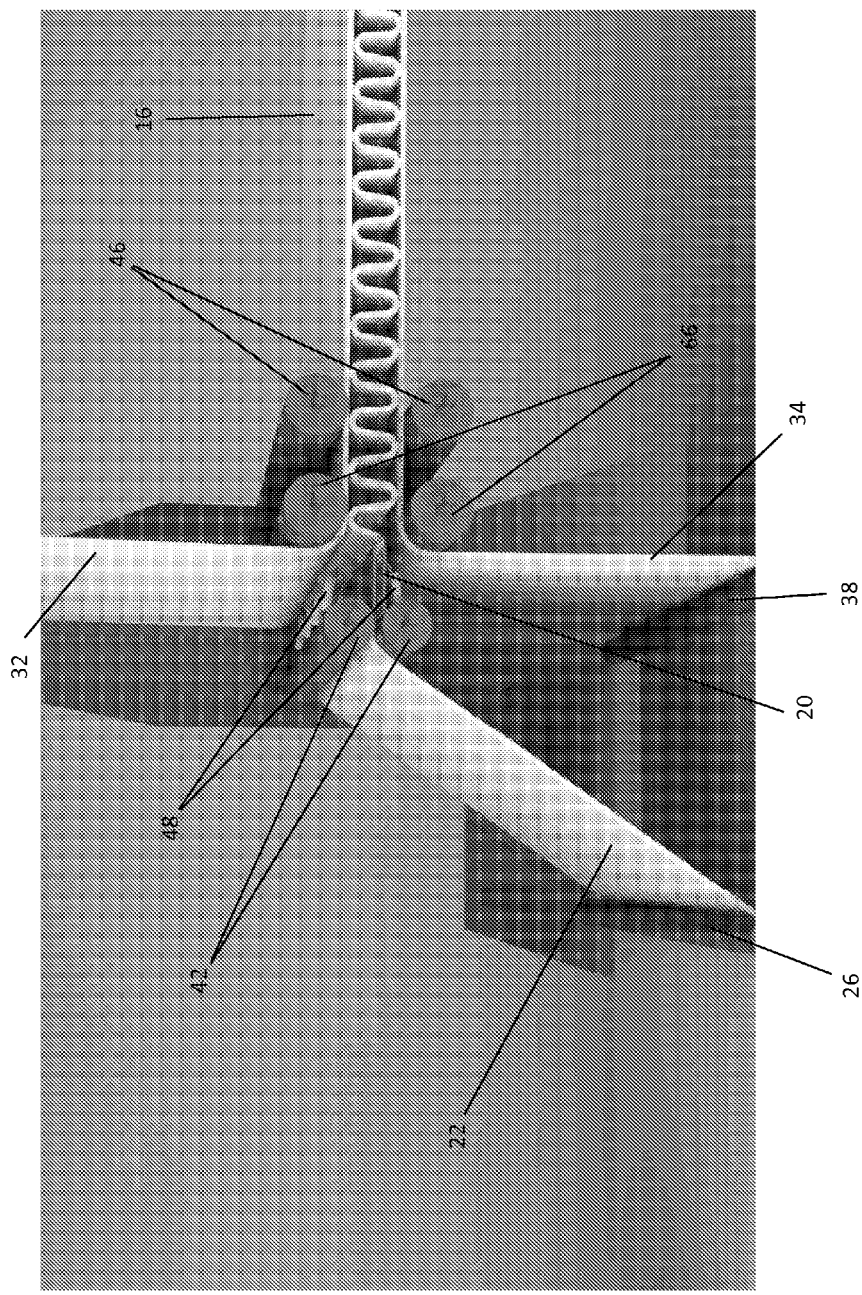
FIG. 12 is a close up of the internal rollers illustrated in FIG. 11.

FIGS. 10, 11 and 12 are CAD renderings of one exemplary embodiment of the corrugation apparatus illustrated in FIGS. 1-9. FIG. 10 is a perspective view of the apparatus 10 showing the placement of the upper 32, middle 22 and lower 34 substrates as they are fed into the corrugation apparatus and the single wall corrugation product 16 exiting apparatus 10. FIG. 11 is a perspective view of the embodiment of the apparatus shown in FIG. 10 but with one wall of the apparatus 10 removed to show the inner rollers. Illustrated are the middle substrate 22 guide roller 26 which guide middle substrate 22 into the drive rollers 42. Upper substrate 32 is passes over guide roller 36 and lower substrate 34 passer under lower guide roller 38. Also shown, after passing under guide roller 26, middle substrate 22 then passes through drive roller pair 42 while the upper and lower substrates 32 and 34 pass through form rollers 66. Upon corrugation, the single wall product 16 then passes through drive rollers 46, pulling product 16 through corrugation apparatus 10. FIG. 12 is a close-up perspective view of the interior of the embodiment of the corrugation apparatus 10 illustrated in FIGS. 10 and 11. In this view, middle substrate 26 is shown passing under guide roller 26 and passing between drive roller pair 42 to be fed at velocity $V_3$ into the apparatus. As shown, heaters 48 are arranged above and below feed guide 20 so as to heat the middle 22 and upper substrate 32 and middle 22 and lower substrate 34 when they impact each other at form rollers 66. Upon bonding of the middle substrate 22 to the upper substrate 32 and middle substrate 22 to the lower substrate 34 the single wall corrugated product exits from form rollers 66 and passes between drive rollers 46 which pulls the bonded product 16 through corrugation apparatus 10.

In one exemplary embodiment, the corrugated products, such as 16, 14 and 18 (FIGS. 1, 8 and 7, respectively) are constructed of a food grade polymer, food grade polylactic acid, or a food grade low density polyethylene (LDPE) according to FDA guidelines 21 CFR177.

Still further according to the present invention, the polyethylene film has a density of 0.85 to 1.00 grams per cubic centimeter; a maximum extractable fraction (expressed as percent by weight of the polymer) in N-hexane at specified temperatures is 5.5% at 50° C.); and a maximum extractable fraction (expressed as percent by weight of the polymer) in xylene at specified temperatures is 11.3% at 25° C.

Example 1

Mattress Fabrication

In various embodiments, the invention comprises a mattress. In these embodiments, the mattress comprises an inner corrugated foam core, a middle cushioning layer and an outer cover layer. In these embodiments, the corrugated foam core can be made as previously described for FIG's 1, 2 and 3. The middle cushioning layer may comprise a second corrugated foam product, a cotton batting layer, densified polyester or foam such as polyurethane, polyester, polypropylene or polylactic acid and the like. The outer cover layer may comprise cotton or a laminated foam wherein the foam comprises, polyurethane, polyethylene, polyester, polypropylene or polylactic acid and the like and the laminate comprises a film independently selected from polyurethane, polyethylene, polyester, polypropylene or polylactic acid and the like. In addition, in various embodiments, the mattress may comprise a flame retardant layer between the middle cushioning layer and the outer cover layer. However, those of skill in the art will appreciate that in various embodiments a flame retardant may not be necessary such as, for example, when the materials themselves are not flammable, such as with polyester, or because a flame retardant is added to one of the other layers. In these embodiments, the flame retardant can be added to the outer cover layer or the middle cushioning layer. For example, if cotton batting is used for the middle cushioning layer, boric acid (generally 15%) or other retardant can be mixed into the cotton and no other flame retardant is necessary. In various exemplary embodiments, the inner foam core shown in FIGS. 1, 2 and 3, is a corrugated product 16 as described herein and utilizes one or more of the above-identified polymers. The corrugated product 16 can include an upper substrate 32, lower substrate 34 and a fluted middle substrate 22 as described herein.

Figure 13:
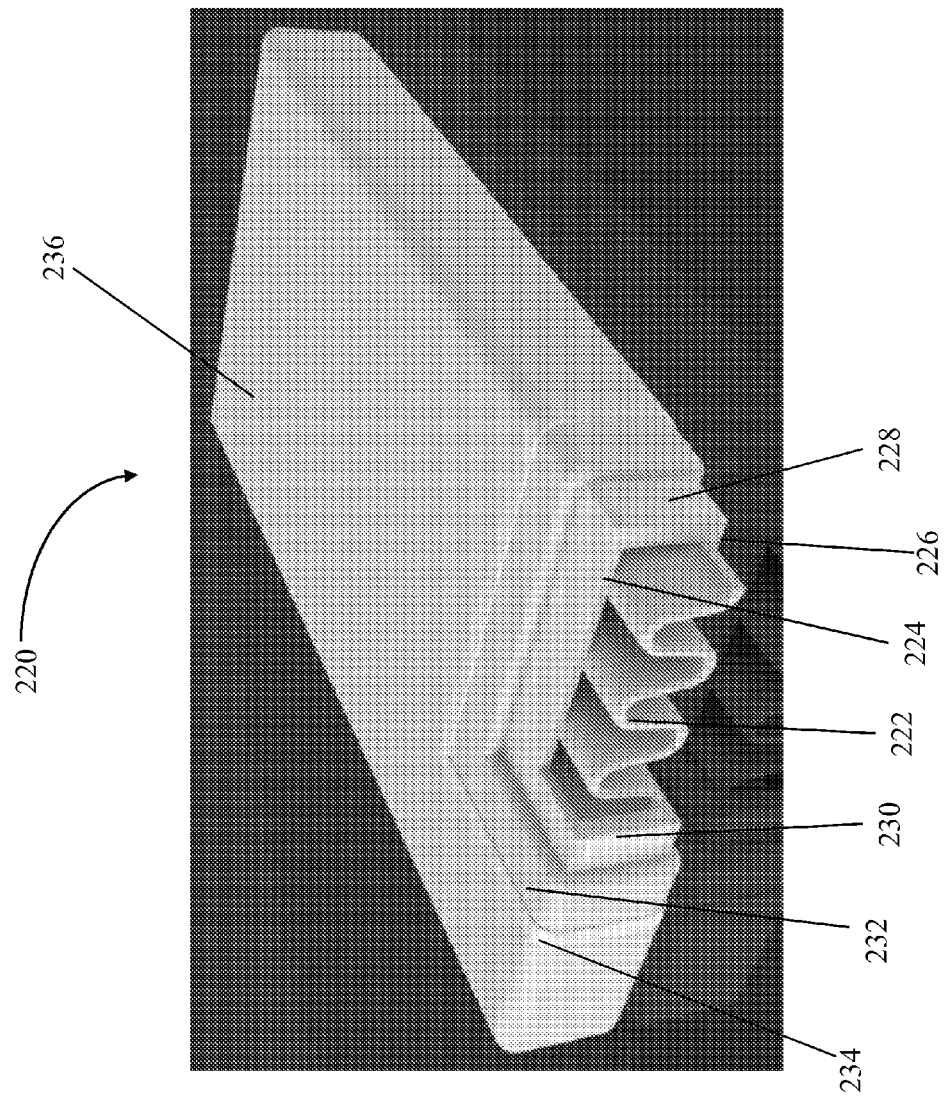
FIG. 13 cut-away, perspective view of one embodiment of a mattress made according to the invention.

FIG. 13 illustrates one embodiment of a mattress 220 made according to the instant invention. As shown, the core of the mattress includes a single wall corrugated product as shown at 16 in FIGS. 1 and 10-12. As shown in FIG. 13 a middle substrate 222 an upper substrate 224 and a lower substrate 226 are cut to a desired size. In various embodiments, an overhang, or open perimeter of upper and lower substrates 224/226 remains and side perimeter piece 228 and end perimeter piece 230 are added and sealed to both sides and ends of the mattress providing support for the edges of the mattress. In various embodiments, those of skill in the art will appreciate that perimeter pieces are not required for the foam mattress 220. Next a layer of cushioning material 232, such as cotton, densified polyester or polypropylene 244 is wrapped around the corrugated foam core 238 followed by a flame barrier 234. Next a surface layer or cover 236 is added. In some embodiments, the cover layer is a woven cotton fabric, polyester or polypropylene while in some embodiments the woven cotton layer polyester or polypropylene is coated with a low density polyethylene that may be food grade (See, for example, 21 CFR 177.1520). However, those of skill in the art will appreciate that the cover layer can be any comfortable fiber or polymer cover. In some embodiments the cover can be a thin foam with a film laminated to it. In various embodiments the film can be polyethylene, polypropylene, polyurethane or the like. It will be appreciated that using the disclosed methods a mattress or cushion of any desirable size can be made.

Figure 14:
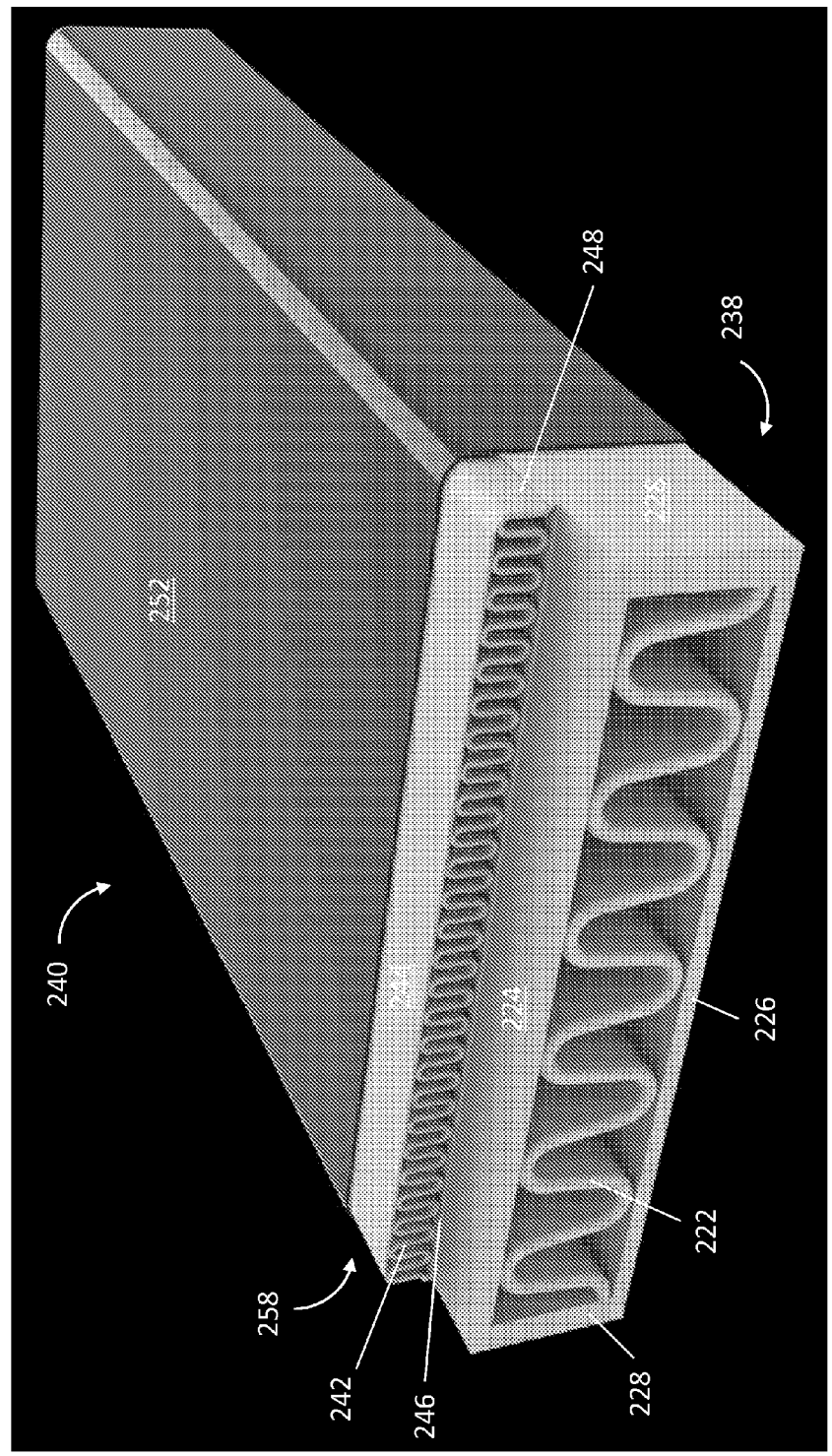
FIG. 14 is a cut-away, perspective view of another embodiment of a mattress made according to the invention.

FIG. 14 illustrates another embodiment of a mattress 240 according to the invention. In this embodiment, the mattress 240 includes a single wall corrugated product 238 such as that illustrate in FIG. 13. In this embodiment the single wall corrugated product includes a top substrate 224, a middle substrate 222 and a bottom substrate 226. The first single wall product 238 can be finished with two end perimeter pieces (not shown) and two side perimeter pieces 228 bonded to the sides and ends of the corrugated product. In addition to closing the interior of the mattress, the side pieces act to provide support for the edges of the mattress. In mattress embodiment 240 there is also a second single wall product 258 fixed to the first single wall product. Included are a top substrate 244, middle substrate, 242 and bottom substrate 246. In addition, in this embodiment, there are two sider perimeter pieces 248 and two end perimeter pieces (not shown). In this embodiment of the mattress 240, the middle substrate 242 and optionally the top 244 and bottom 246 substrates may be made of a thinner foam so as to provide a more resilient upper layer providing more cushioned for the mattress user. In addition, the second single-wall corrugation product 258 is easily fixed to the first single wall corrugation product 238 by heating the opposing substrates (e.g., 224 and 246) before they are stacked such that they are bonded to each other. After the first corrugated product 238 and second corrugated product 258 may be bonded together the compound product is then wrapped in a cover 252.

In various embodiments, mattress cover 236 and 252 comprises a layer of cotton or thin foam with polymer film laminated to it. For example, when the mattress cover 236/252 is foam the foam may be ¹⁄₃₂-⅛ inch composed of polyurethane, polyethylene, polyester, polypropylene or polylactic acid. In these embodiments, the polymer film can be independently selected from polyurethane, polyethylene, polyester, polypropylene or polylactic acid. In addition, while in some embodiments the cover may envelop the mattress so as to contain it on all sides and have an open end to accept insertion of the mattress. In other embodiments, the cover may only cover the top portion of the mattress and be bonded to the sides of the first corrugated product so as to cover the underlying cushioning layer or second corrugated product. Those of skill in the art will appreciate that the cushioning layer, e.g., the second corrugated product does not need to be bonded to the first corrugated product when the cover is used. For example, when the cover is bonded to the sides of the first corrugated product, such as for example by heat sealing the cover to the sides or by adhesives, the cover will hold the cushioning layer in place. Similarly, when the cover encases the mattress, like for example, a pillow case, the cover is stretched over the mattress and holds the component pieces together, thereby simplifying construction of the mattress. In some embodiments, the open end of the cover may be sealed. Of course, those of skill in the art will appreciate that the cover can be used in those embodiments of the mattress where the cushioning layer is not a second corrugated product. For example, the cover is equally useful when the cushioning layer comprises cotton, densified polyester or polypropylene cushioning.

In addition, while mattress 240 is "one-sided" e.g., it has only the second single wall product 258 attached to one of the surfaces of the first single wall product 238, it is contemplated that the mattress could be one sided with a second single wall cushion product bonded to the other side of product 238. Further, those of skill in the art will appreciate that, while the embodiment of mattress 240 shown comprises two separate single wall products 238 and 258 bonded to each other, the mattress could comprise a hybrid product 14 as shown in FIG. 8 with a further foam piece or substrate bonded to fourth substrate 78. Those of skill in the art will appreciate that mattress 240 can be any size mattress ranging from a crib mattress for babies to any desired size. Further, those of skill in the art will appreciate that, while FIGS. 13 and 14 illustrate the flutes of the corrugation layer aligned with the long axis of the mattress, in some embodiments according to the invention, the corrugated layer may be arranged such that the flutes are aligned with the short axis of the mattress.

Also, according to the present invention, the outer layer of the article of furniture can be heat fused to a non-toxic substrate within the article so as to provide improved tensile strength and tear resistance to the outer layer of the article. The non-toxic fabric substrate can be constructed of materials including cotton, polyester, polypropylene and others or combinations thereof.

The innermost component of the article of furniture is constructed of a corrugated, polymeric support system that gives the article necessary strength, maintains the desired shape of the article, provides the majority of the cushioning requirements and provides the required weight support.

The corrugated support system includes an upper layer, wherein the upper layer has a length, a width and a thickness; an optional lower layer, wherein the lower layer has a length, a width and a thickness; and a middle, fluted layer placed between the upper and lower layer. The fluted layer has a length, a width and a thickness, wherein the fluted layer is affixed to the upper and lower layers at contact points of the fluted layer with the upper and lower layers. In general, polymeric media comprising the upper layer, lower layer and middle layer is heated to a softening and passed through a series of rollers to effect the corrugated shape. Cooling of the polymer provides the final corrugated article.

Example 2

Use of Plastic Stock for the Fabrication of Corrugated Plastic

Figure 15:
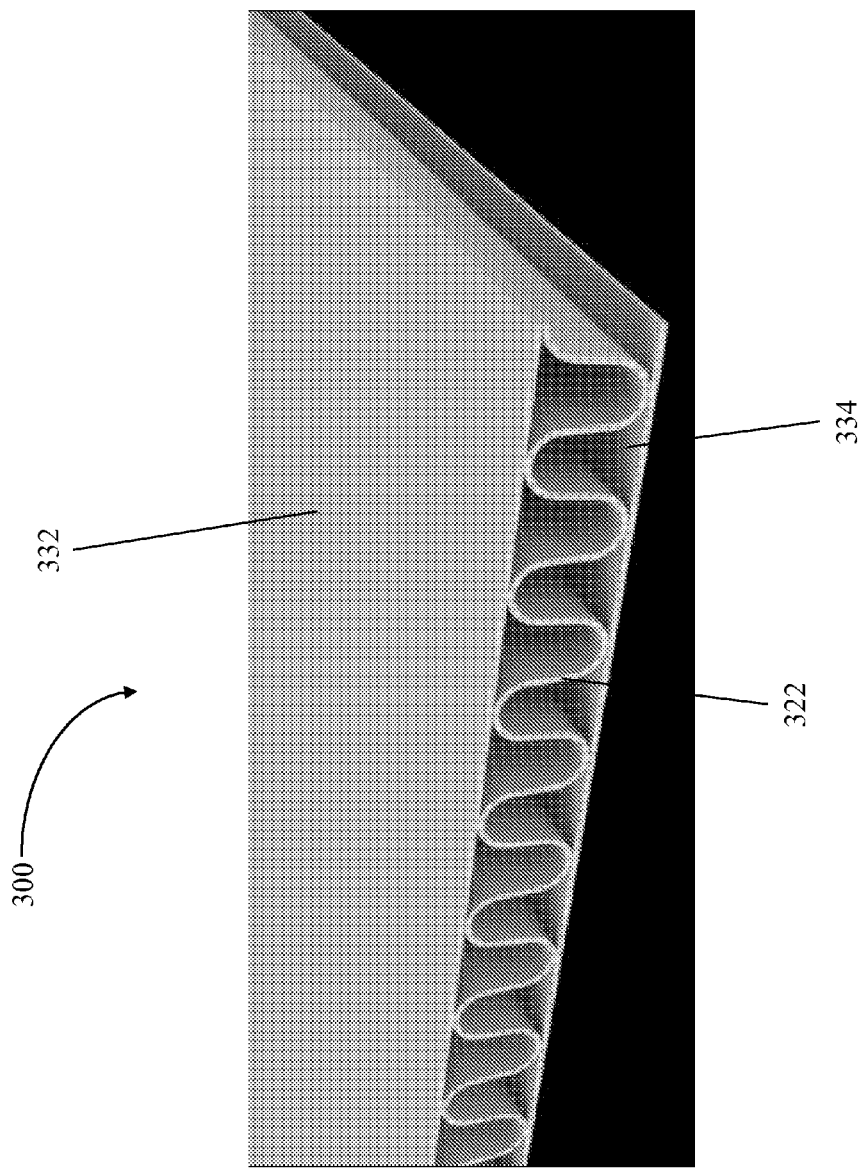
FIG. 15 is a perspective view of a corrugated plastic panel made according to one embodiment of the invention.
Figure 16:
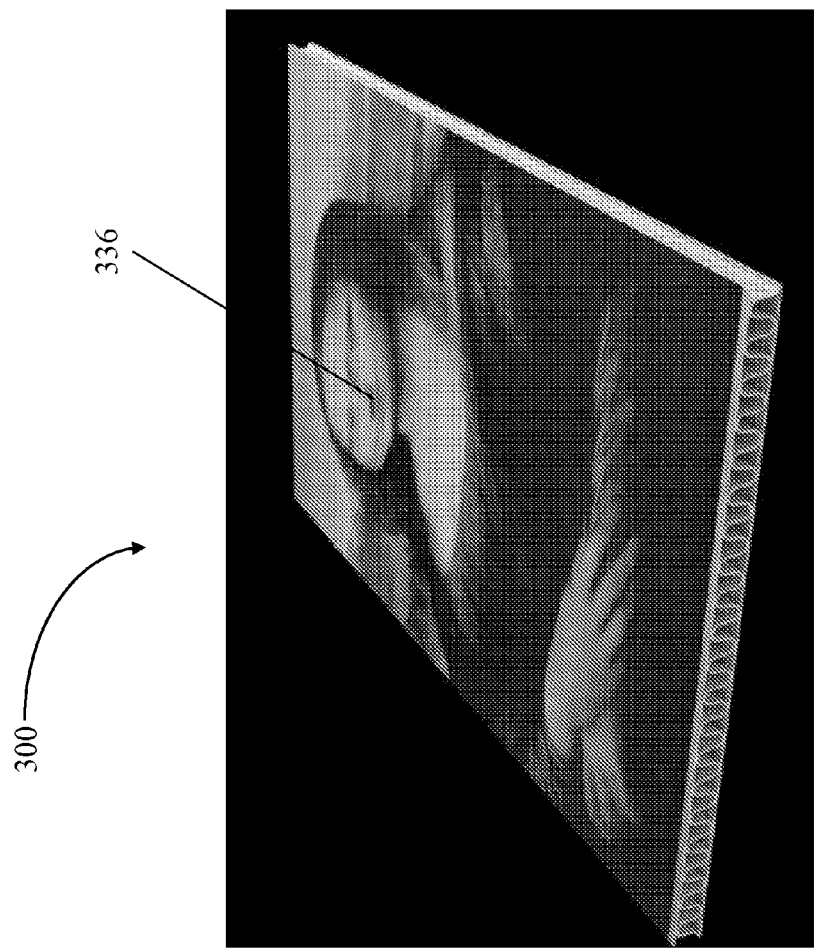
FIG. 16 is a top-plan perspective view of a corrugated plastic panel as shown in FIG. 14 but with the upper substrate having a pre-printed picture on it.
Figure 17:
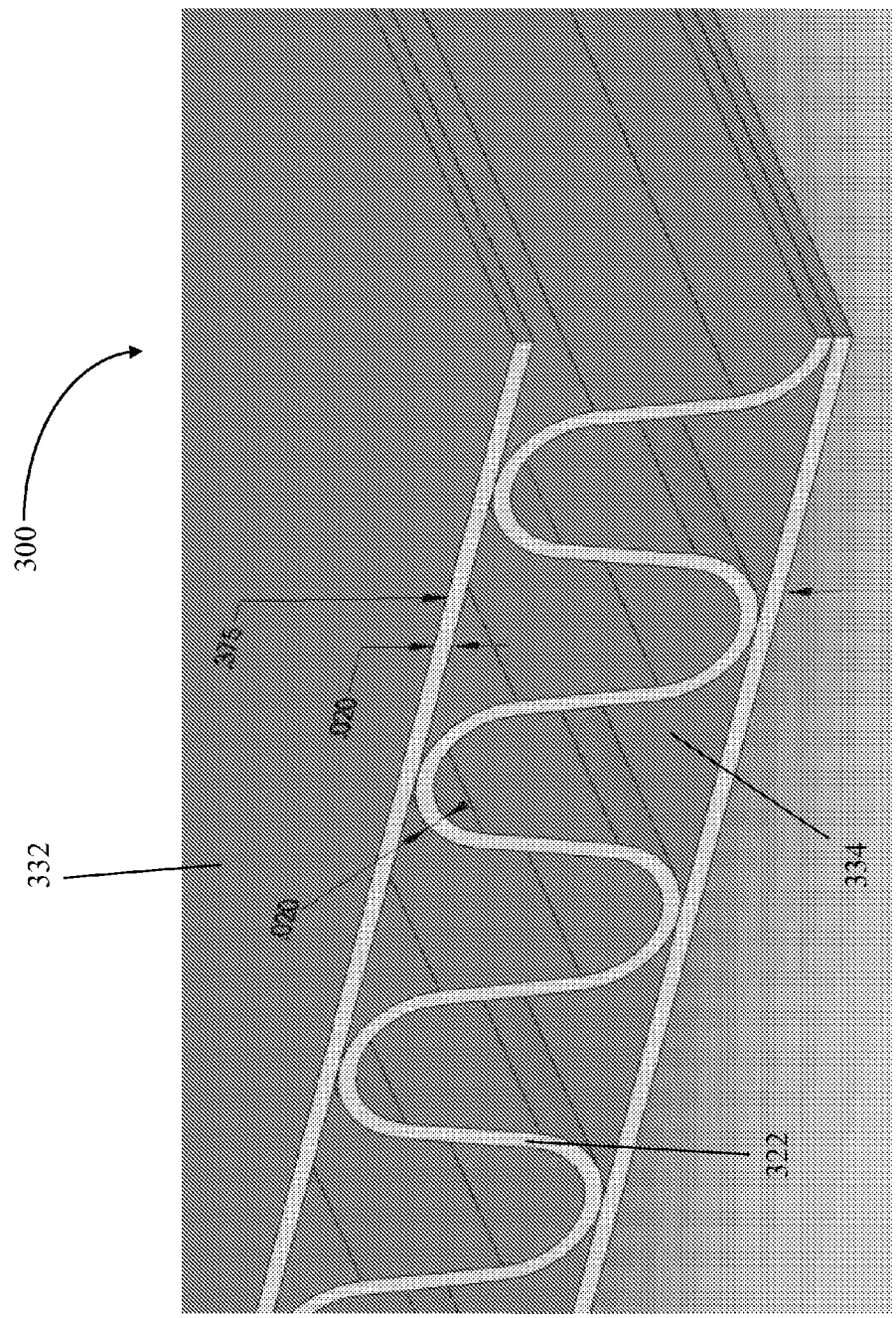
FIG. 17 is a schematic diagram of the corrugated plastic panel shown in FIG. 14 illustrating some usable sizes of plastic and dimensions of the panel according to one embodiment of the invention.

FIG. 15 illustrates a panel 300 made of corrugated plastic. As shown the panel 300 includes upper substrate 332, lower substrate 334 and middle substrate 322. FIG. 16 illustrates a plastic panel 300 such as that shown in FIG. 15 but with a printed surface 336. Using the disclosed technique, printed substrates such as 336 can be pre-made prior to the corrugation process. FIG. 17 illustrates a plastic panel such as that shown in FIGS. 15 and 16 showing some usable dimensions for this embodiment. Plastic substrates such as those represented at 332, 334 and 322 are commercially available such as from, for example, Blueridge Films, Inc. (http://www.blueridgefilms.com/). In these embodiments the bonding of the flutes to the upper and lower substrate is achieved by ultrasonic welding.

Example 3

Use of Metal Roll Stock for the Fabrication of Corrugated Steel

Figure 18:
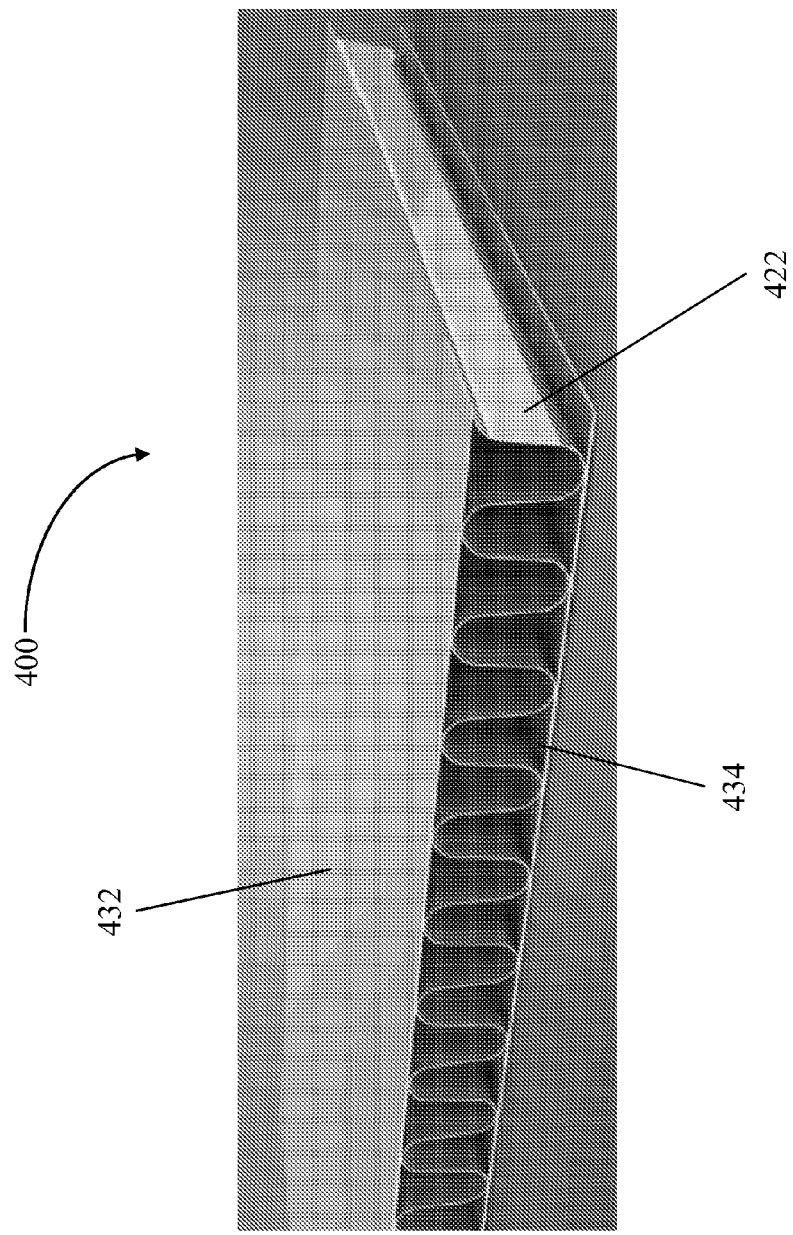
FIG. 18 is a top-plan perspective view of a corrugated stainless steel panel made using the corrugation apparatus according to one embodiment of the invention.
Figure 19:
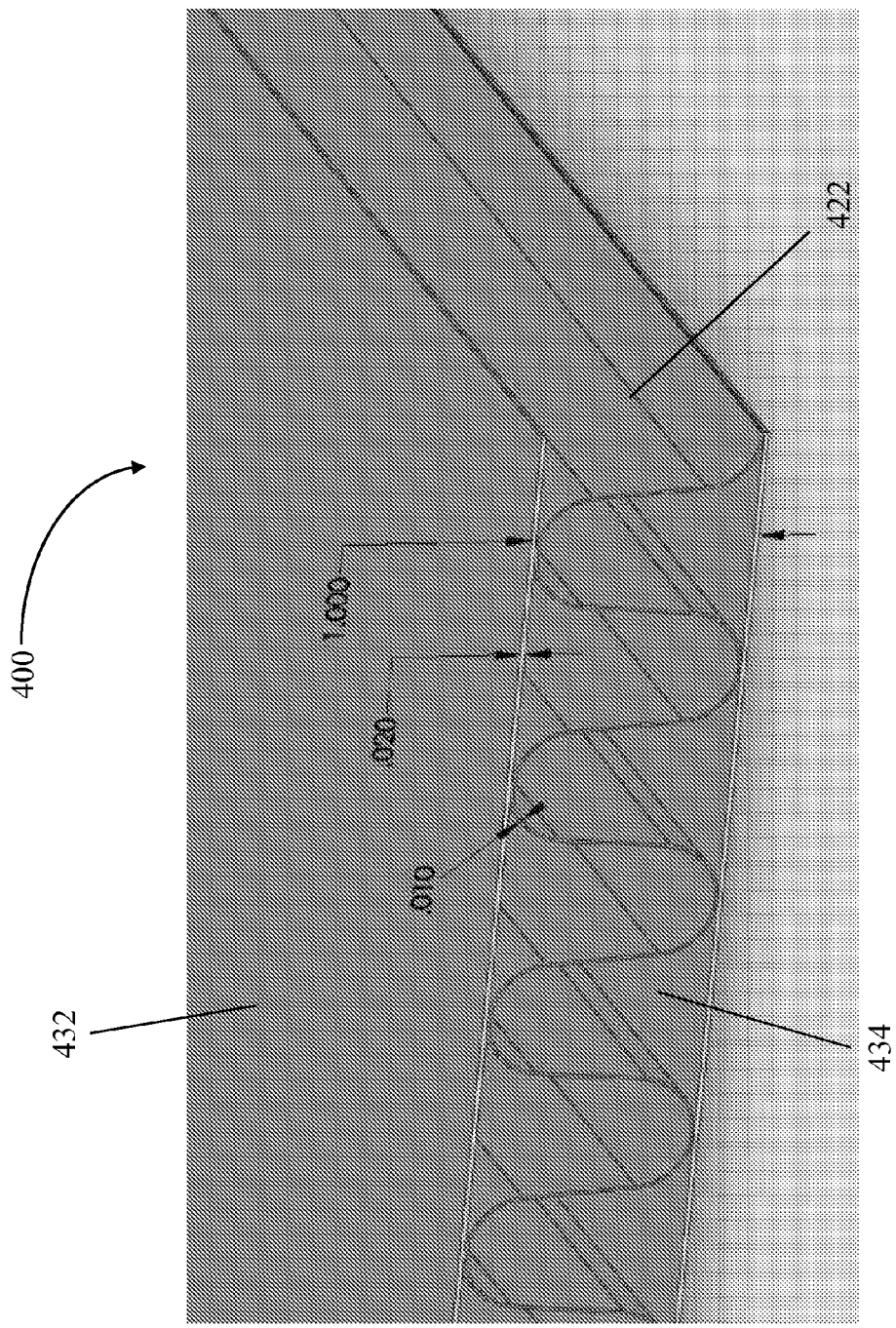
FIG. 19 is a schematic diagram illustrating some usable sizes and dimensions of the stainless steel panel shown in FIG. 23.

In some embodiments, according to the invention, as shown in FIG. 18, a corrugated steel panel 400 can be made using steel roll stock for one or more of the substrates 432, 434, 422. In this embodiment, the roll stock can be any of those commercially available. FIG. 19 illustrates some usable dimensions for the corrugated steel panel 400. In these embodiments the bonding of the flutes to the upper and lower substrate is achieved by ultrasonic welding.

Example 4

Fabrication of Molded Furniture

Figure 20:
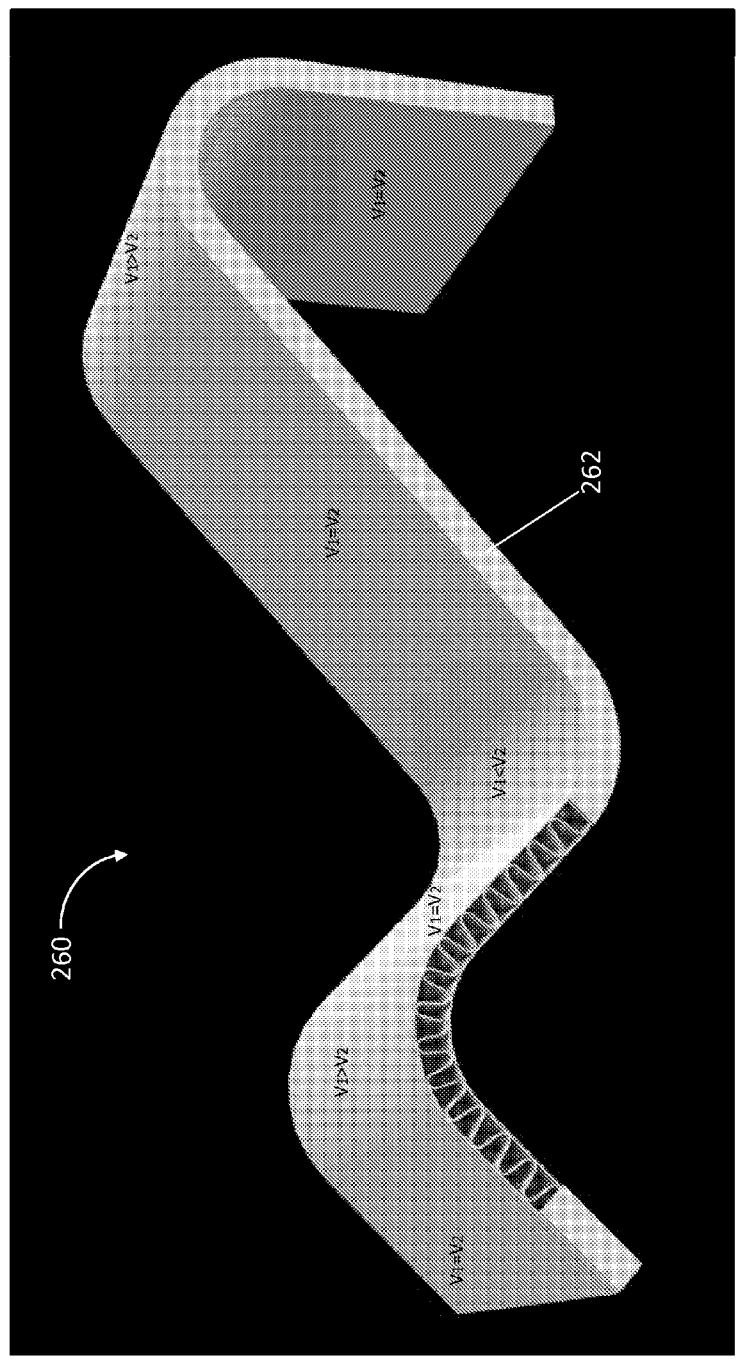
FIG. 20 is a perspective view of a chair, according to one embodiment of the invention, made by varying only $V_1$ and $V_2$ in real time using the corrugation apparatus.
Figure 21:
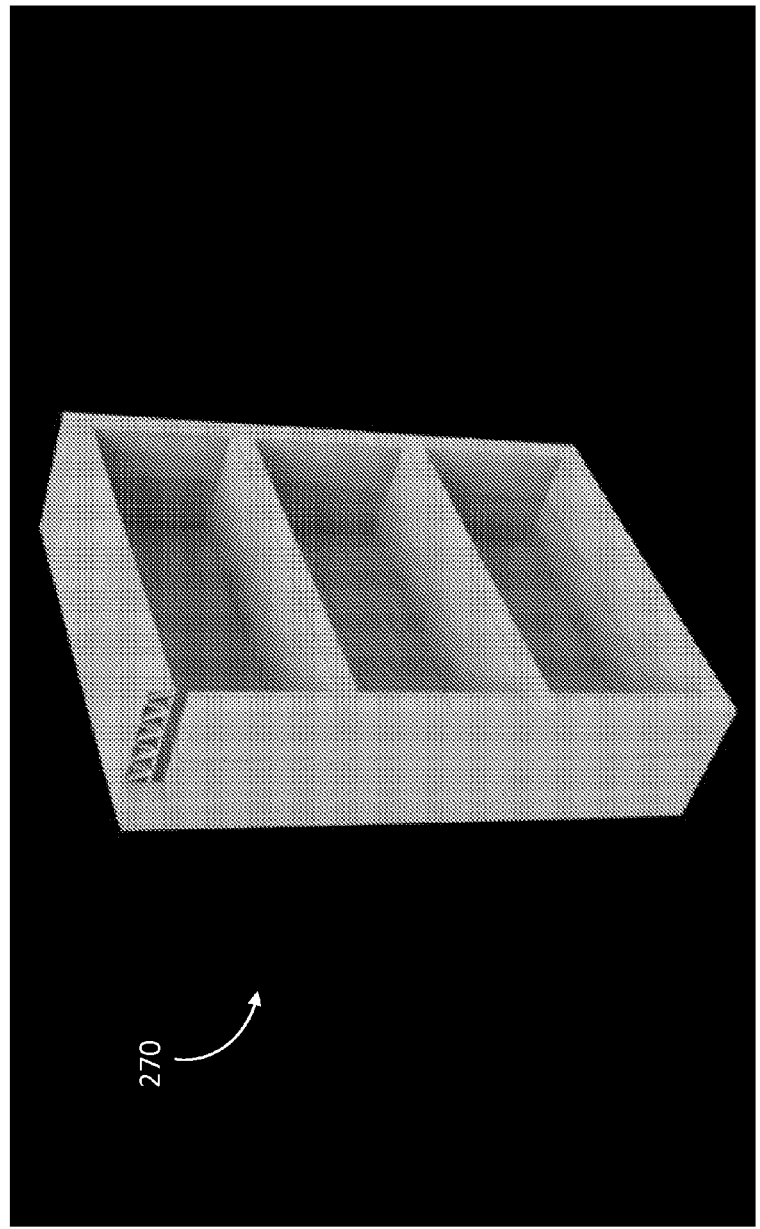
FIG. 21 is a perspective view of a bookshelf made using the corrugation apparatus according to one embodiment of the invention.

FIGS. 20 and 21 represent various exemplary embodiments of furniture that can be constructed according to the present invention. FIG. 20 is a cut-away of a stylized chair 260 that can be constructed using the present invention and showing the interior flutes of the middle substrate. As shown the chair can be constructed by varying the ratio of $V_1$ to $V_2$ in real time. In the embodiment of the chair 260 shown, a perimeter or overhang of the upper and lower substrate with respect to the middle substrate is provided such that edge pieces 262 can be inserted to seal the chair. FIG. 21 illustrates a bookshelf 270 made using the corrugated products of the invention according to another exemplary embodiment. In the embodiment shown, six planar, single wall corrugated pieces are assembled as shown to comprise two side pieces, two shelves and a top and a bottom to the bookshelf. Additionally, a back piece is provided in the book case which is optional and can be a corrugated product if desired or may just be an individual piece of substrate. In this embodiment, the corrugated products are produced with a "wood-grain" finish comprising a pre-printed-wood grain by the process used in FIG. 15. In this embodiment a standard wood veneer is glued to the outer surface of the corrugated product. Such veneers are commercially available, such as from, for example, WiseWood Veneer, (http://www.wisewoodveneer.com/index.html). Those of skill in the art will appreciate that when fabricating furniture according to the instant invention, different substrates can be used as desired. For example, chair 260 may have a stiff plastic, load-bearing plastic as the lower substrate while a soft foam may be desirable as the upper substrate. The middle substrate can be varied according to the stiffness of the cushion desired by the user. Of course, those of skill will appreciate that the substrates may all be the same, such as for instance load-bearing plastic and a foam of cushion piece may be applied to the upper surface of chair 260 if desired. In addition, while the foam pieces are generally available from the manufacturer in white, foam pieces can be dyed to any desirable color.

Figure 22:
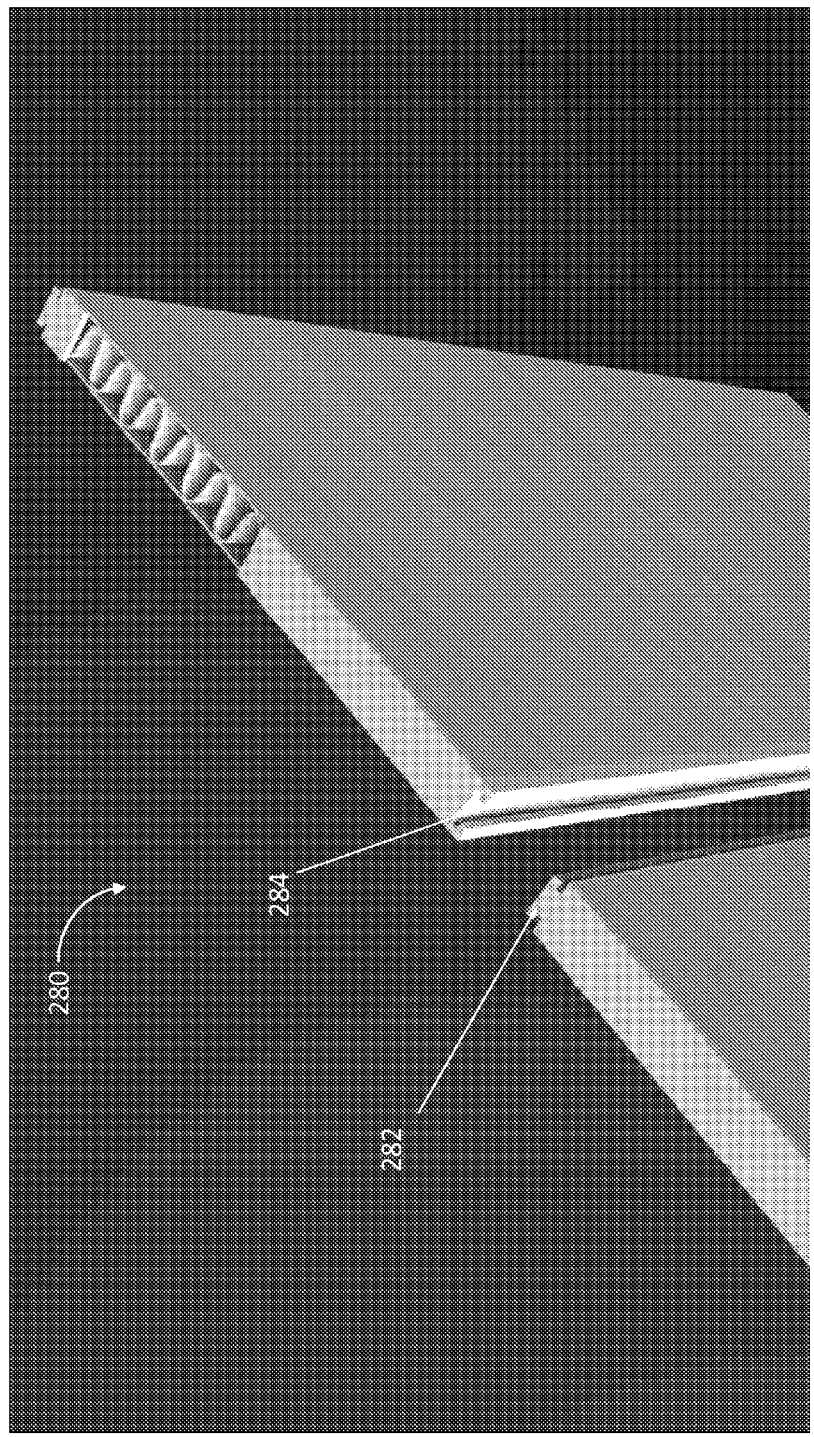
FIG. 22 is a perspective view of a partition panel made using the corrugation apparatus according to one embodiment of the invention.

FIG. 22 illustrates partition panels according to one embodiment of the invention. In this embodiment, the partitions, such as those used for making office "cubicles" can be made using any desirable material for the upper, middle and lower substrates and can provide any desirable finish. For example, for interior office spaces, it may be desirable to have an outer surface that is hard and durable such as a stiff plastic. The interior surface of the partition, the substrate can be made of a dense, closed cell foam such that the user of the office cubicle can use pins or other fastening devices to attach paper or the like to the substrate surface. In some embodiments, it may be desirable for the middle substrate to be a sound absorbing foam such that noise is absorbed by the partition. In addition, the purchaser can choose to have the outer surface printed with any desirable motif such as a wood grain, a soothing forest scene or the like. The partition panels 280 can be any desirable size and can be set into a frame having alternating male and female flanges 282/284.

Example 5

Fabrication of Corrugated Columns

FIG. 23 illustrates a column made of single wall corrugated product according to one embodiment of the invention. As illustrated, the corrugated column is made by maintaining a constant ratio of $V_1 > V_2$ (or $V_2 > V_1$). Those of skill in the art will appreciate that the diameter of the column can be controlled simply by using a desired ratio of V1 to V2. For example, for a small diameter column, V1 would be much greater than V2 whereas a larger diameter column would require less difference between the two velocities. Similarly, an oblong column could be manufactured by having V1=V2 symmetrically on either side of a curved portion (e.g., V1>V2). Those of skill in the art will appreciate that the column can be any size and, as with other product can be composed of any substrate required. Thus, the column 290 can be fabricated of foam, plastic or metal and can be used to make the legs of a table when attached to a planar corrugated product such as that shown for the wall panel or the legs of a chair, etc. when attached to a product such as 260 shown in FIG. 20. Similarly, the column can be used for a structural component when fabricated with a metal roll stock and used as a building support. Further, when fabricated, the ends of the column can be fastened together by leaving an overhang of the upper and lower substrates with respect to the middle substrate and joining the ends, such as by sonic welding to comprise a completely closed circular column.

Example 6

Fabrication of Building Materials

Figure 24:
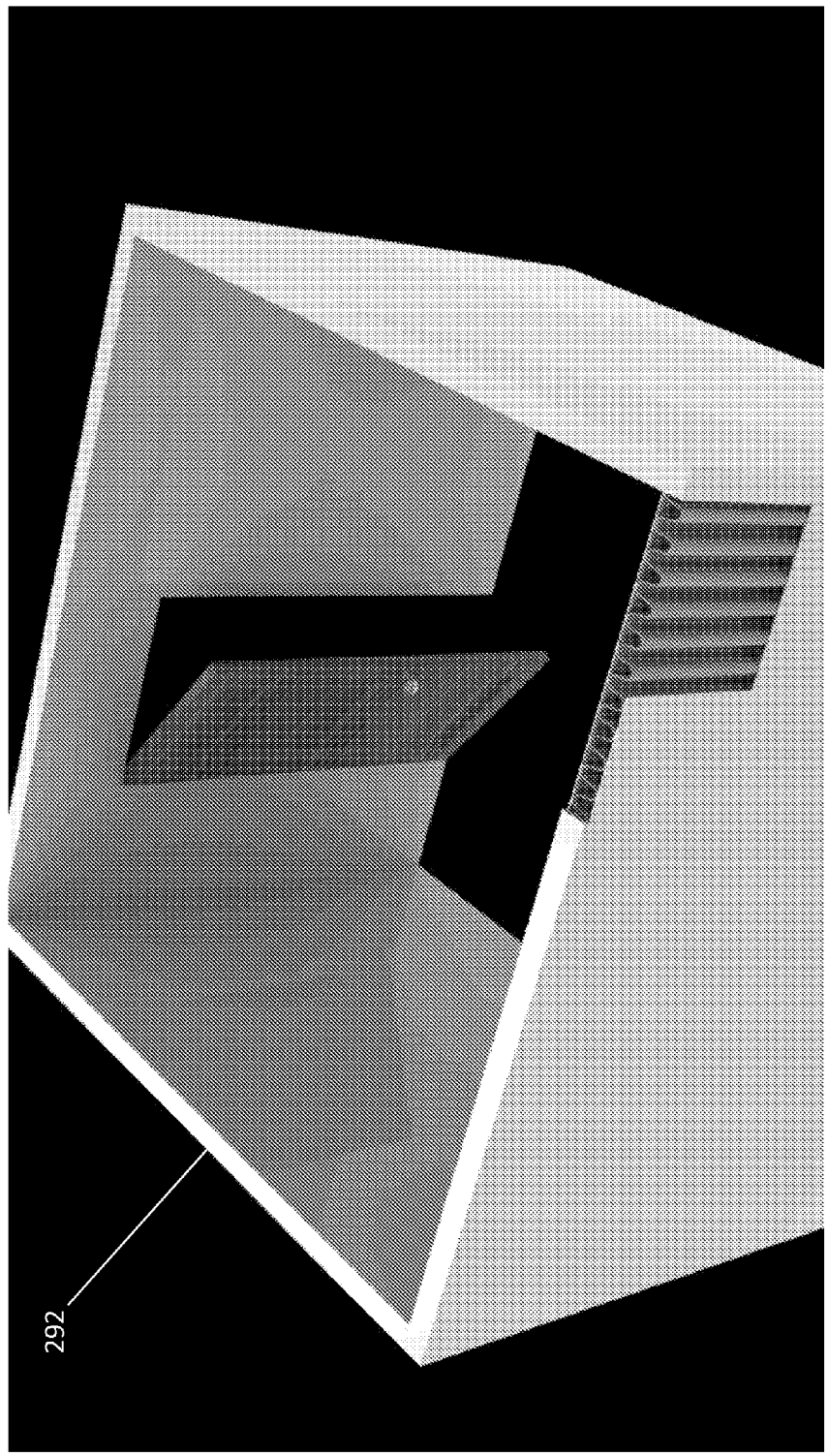
FIG. 24 is a top-plan perspective view of a building constructed using corrugated wall panels according to one embodiment of the invention.

In an another exemplary embodiment, shown in FIG. 24, the corrugation apparatus can be used for making building materials such as walls and roofs (not shown) for houses. These building panels may be used for construction of wall having weight bearing capabilities. In this embodiment the upper and lower substrates can be more robust, such as, for example, plastic, rolled metal stock such as copper or steel. In addition, the middle substrate can be any desirable substrate such as sound absorbing foam, or plastic or metal. Generally, when used for wall panels, the corrugated product of the invention is about 8'×14' or larger. The panels can be fitted together using any suitable means. For example, the panels can have complementary tracks comprising a male flange similar to that shown in FIG. 22 or tongue and groove coupling that can be secured together by any convenient device such as screws (not shown). Further conduits can be provided in the space defined by the flutes such that the corrugated building panels do not need to be altered to accept electricals and the like. Further, it should be appreciated that, while the building panels of the instant invention can be substituted for conventional building components, such as ply-wood and/or 2×4's the building panels can also be formed to encompass the finishing materials as well. Thus, the outer substrate of the corrugated product may be cured and/or smooth such that the building panel also incorporates the smoothness and finishabilty of drywall. In addition, it will be appreciated that the corrugated material could be either polymer or cellulose-based or, mixtures of the two.

The following paragraphs enumerated consecutively from 1 through 69 provide for various aspects of the present invention. In one embodiment, in a first paragraph (1), the present invention provides:

1. A method to prepare a corrugated product, comprising the steps of: providing an upper and a lower substrate at a rate of $V_1$ and $V_2$ wherein the upper and lower substrates are maintained at a distance $S_1$ from each other; and providing a middle substrate, interposed between the upper substrate and the lower substrate, at a rate of $V_3$, at a trajectory to impact the upper or lower substrates, wherein the rate $V_3$ is greater than the rates of $V_1$, and $V_2$ such that the middle substrate forms flutes alternately contacting the upper and lower substrates; wherein a corrugated product is formed.

2. The method of paragraph 1, wherein the distance S1 is delimited by a form guide.

3. The method of paragraph 2, wherein the form guide comprises an upper and a lower surface.

4. The method of paragraph 3, wherein the upper and lower surface comprises plates or rollers.

5. The method of paragraphs 1-4, wherein the middle substrate is directed between the upper substrate and the lower substrate by a feed guide.

6. The method of either of paragraphs 1 through 5 further comprising drive rollers positioned prior to the feed guide to drive the middle substrate.

7. The method of any of paragraphs 1 through 6, further comprising a second set of drive rollers after the form guide to pull the corrugated product through the apparatus.

8. The method of any of paragraphs 1 through 7, further comprising attaching the flutes of the middle substrate to the upper and lower substrates.

9. The method of paragraph 8, wherein the flutes of the middle substrate are attached via an adhesive, a solvent suitable to partially dissolve the substrates, infrared heat, heat, laser welding or ultrasonic welding.

10. The method of any of paragraphs 1 through 9, wherein $V_1$ and $V_2$ are equal.

11. The method of paragraphs 1 through 10, wherein the substrates are independently selected from poly(lactide-co-glycolide) (PLGA), polylactide (PLA), polyglycolide (PGA), D-lactide, D, L-lactide, L-lactide, D, L-lactide-epsilon-caprolactone, D, L-lactide-glycolide-epsilon-caprolactone, polyepsilon-caprolactone, glycolide-caprolactone or combinations thereof, carboxymethyl cellulose, cellulose acetate, cellulose acetate propionate, ethyl cellulose, hydroxypropyl methyl cellulose, hydroxyalkyl methyl celluloses, and alkyl celluloses, polydimethylsiloxane, polyethylene-co-(vinyl acetate), poloxamer, polyvinylpyrrolidone, poloxamine, polypropylene, polyamide, polyacetal, polyester, poly ethylene-chlorotrifluoroethylene, polytetrafluoroethylene (PTFE or "Teflon™"), styrene butadiene rubber, polyethylene, polypropylene, polyphenylene oxide-polystyrene, poly-alpha-chloro-p-xylene, polymethylpentene, polysulfone, non-degradable ethylene-vinyl acetate (e.g., ethylene vinyl acetate disks and poly(ethylene-co-vinyl acetate)), poly(N-isopropylacrylamide), delrin, polyurethane, copolymers of silicone and polyurethane, polyolefins (such as polyisobutylene and polyisoprene), acrylamides (such as polyacrylic acid and poly(acrylonitrile-acrylic acid)), neoprene, nitrile, acrylates (such as polyacrylates, poly(2-hydroxy ethyl methacrylate), methacrylates, methyl methacrylate, 2-hydroxyethyl methacrylate, and copolymers of acrylates with N-vinyl pyrrolidone), N-vinyl lactams, polyacrylonitrile, glucomannan gel, vulcanized rubber, poly(3-hydroxybutyrate) and combinations thereof.

12. The method of any of paragraphs 1 through 8, wherein the upper, lower and middle substrates comprise polyethylene.

13. The method of paragraph 8, wherein the polyethylene is closed cell low density polyethylene foam.

14. The method of paragraphs 1 through 13, wherein the polyethylene is food grade polyethylene.

15. An apparatus to prepare a corrugated product, comprising:
a first pair of drive rollers actuated to drive a middle at a velocity $V_3$; a form guide positioned after the drive rollers; wherein the form guide provides an upper surface to guide an upper substrate and a lower surface to guide a lower substrate; a second pair of drive rollers actuated to have a velocity $V_1$; wherein $V_3$ is greater than $V_1$; a bonding device positioned about the upper surface and the lower surface of the form guide, wherein the bonding device attaches the middle substrate to the upper and lower substrates; wherein a corrugated product is prepared.

16. The apparatus of paragraph 15, wherein the form guide is a set of substantially parallel plates, parallel rollers or a combination thereof.

17. The apparatus of paragraphs 15 through 16, wherein a feed guide is positioned after the first pair of drive rollers and comprises two plates separated by a distance that can be varied to accept the middle substrate.

18. The apparatus of any of paragraphs 15 through 17, wherein the bonding device is a heater, a solvent, a sonic welder, a laser welder or an adhesive bonding the flutes of the middle substrate with the upper and lower substrates.

19. The apparatus of any of paragraphs 15 through 18, further comprising a cutting apparatus.

20. The apparatus of paragraphs 15 through 19, further comprising one or more guide rollers to guide the upper substrate into the form guide and the lower substrate into the form guide.

21. The apparatus of paragraphs 15-20, wherein the second pair of drive rollers is situated in the apparatus after the corrugated product exits the form guide.

22. The apparatus of paragraphs 15-20, wherein the second pair of drive rollers is located before the form guide and drives only the upper substrate at a velocity $V_1$.

23. The apparatus of paragraphs 15-20, and 22 wherein a third set of drive rollers is located before the form guide and drives only the lower substrate at a velocity $V_2$.

24. The apparatus of paragraphs 15 through 23 wherein the drive rollers are actuated separately.

25. The apparatus of paragraphs 15 through 23 wherein the drive rollers are actuated together.

26. An apparatus to prepare a corrugated article, comprising:
a first pair of drive rollers to feed a middle substrate at a rate $V_3$ through the feed guide;
a form guide, positioned after the first pair of drive rollers and comprising an upper and a lower surface separated by a distance $S_1$, wherein the form guide accepts an upper substrate on its upper surface and a lower substrate on its lower surface;
a bonding device positioned about the upper surface and the lower surface of the form guide, wherein the bonding device attaches flutes of the middle substrate to the upper and lower substrates to provide a corrugated product;
a second pair of drive rollers positioned after the form guide and pulls the corrugated product through the apparatus;
wherein a corrugated article is produced.

27. The apparatus of paragraph 26, wherein the form guide is a set of substantially parallel plates, parallel rollers or combinations thereof.

28. The apparatus of paragraphs 26 through 27, further including a feed guide, wherein the feed guide is two plates separated by a distance that can be varied to accept the middle substrate.

29. The apparatus of any of paragraphs 26 through 28, wherein the bonding device is a heater, a sonic welder, a laser welder or an adhesive bonding the flutes of the middle substrate with the upper and lower substrates.

30. The apparatus of any of paragraphs 26 through 29, further comprising a cutting apparatus.

31. A method of making a corrugated product comprising:
(a) providing an upper substrate and a lower substrate, the upper substrate moving at a velocity $V_1$ and the lower substrate moving at a velocity $V_2$, the upper substrate and the lower substrate being essentially parallel to each other and separated by a distance '$S_1$';
(b) providing a middle substrate, the middle substrate situated between the upper substrate and the lower substrate and moving at a velocity $V_3$, wherein $V_3$ is greater than $V_1$ or $V_2$;
(c) propelling the middle substrate at a trajectory to contact the upper substrate or the lower substrate, wherein upon contact with the upper substrate or the lower substrate, the middle substrate rebounds in an opposite direction to contact the opposing substrate, wherein, upon contact with the opposing substrate, the middle substrate rebounds to contact the other substrate; and
(d) attaching the point of contact of the middle substrate with the upper substrate and the lower substrate such that the middle substrate forms flutes between the upper substrate and the lower substrate;
wherein a corrugated product is provided.

32. The method of paragraph 31, wherein $V_1$ and $V_2$ are equal.

33. The method of paragraph 31, wherein $V_1$ and $V_2$ are not equal.

34. The method of paragraphs 31 through 33, wherein the first, second and third substrates independently comprise:
polyethylene derivatives, polylactic acid derivatives, cellulose derivatives, silicon and silicon-based polymers and methacrylates.

35. The method of paragraphs 31 through 34, wherein the first, second and third substrates independently comprise:
poly(lactide-co-glycolide) (PLGA), polylactide (PLA), polyglycolide (PGA), D-lactide, D, L-lactide, L-lactide, D, L-lactide-epsilon-caprolactone, D, L-lactide-glycolide-epsilon-caprolactone, polyepsilon-caprolactone, glycolide-caprolactone or combinations thereof, carboxymethyl cellulose, cellulose acetate, cellulose acetate propionate, ethyl cellulose, hydroxypropyl methyl cellulose, hydroxyalkyl methyl celluloses, and alkyl celluloses, polydimethylsiloxane, polyethylene-co-(vinyl acetate), poloxamer, polyvinylpyrrolidone, poloxamine, polypropylene, polyamide, polyacetal, polyester, poly ethylene-chlorotrifluoroethylene, polytetrafluoroethylene (PTFE or "Teflon™"), styrene butadiene rubber, polyethylene, polypropylene, polyphenylene oxide-polystyrene, poly-alpha-chloro-p-xylene, polymethylpentene, polysulfone, non-degradable ethylene-vinyl acetate (e.g., ethylene vinyl acetate disks and poly(ethylene-co-vinyl acetate)), poly(N-isopropylacrylamide), delrin, polyurethane, copolymers of silicone and polyurethane, polyolefins (such as polyisobutylene and polyisoprene), acrylamides (such as polyacrylic acid and poly(acrylonitrile-acrylic acid)), neoprene, nitrile, acrylates (such as polyacrylates, poly(2-hydroxy ethyl methacrylate), methacrylates, methyl methacrylate, 2-hydroxyethyl methacrylate, and copolymers of acrylates with N-vinyl pyrrolidone), N-vinyl lactams, polyacrylonitrile, glucomannan gel, vulcanized rubber, poly (3-hydroxybutyrate) and combinations thereof.

36. The method of paragraphs 31 through 35, wherein the polyethylene is closed cell low density polyethylene foam.

37. The method of paragraphs 31 through 36, wherein the upper, lower and middle substrates are independently selected from: a food grade polymer, food grade polylactic acid or a food grade low density polyethylene (LDPE) according to FDA regulations.

38. The method of paragraphs 24 through 30, wherein attaching is accomplished using an adhesive, a solvent suitable to partially dissolve the substrates, infrared heat, heat, laser or ultrasonic welding.

39. A corrugated mattress comprising: a first corrugated product, the first corrugated product including:
an upper substrate;
a middle substrate; and
a lower substrate;
wherein the middle substrate is fluted and the flutes are fixed to the upper and lower substrates to form a single wall corrugated foam mattress.

40. The corrugated mattress of paragraphs 39, further comprising a next layer of cotton, densified polyester or polypropylene covering the corrugated foam product.

41. The corrugated mattress of paragraphs 39 through 40, wherein a flame barrier covers the cotton polyester or polypropylene covering.

42. The corrugated mattress of paragraphs 39 through 41, further comprising a surface layer.

43. The corrugated mattress of paragraphs 39 through 42, wherein the upper, middle and lower substrates independently comprise:

polyethylene derivatives, polylactic acid derivatives, cellulose derivatives, silicon and silicon-based polymers and methacrylates.

44. The corrugated mattress of paragraphs 39 through 43, wherein the upper, middle and lower substrates independently comprise:

poly(lactide-co-glycolide) (PLGA), polylactide (PLA), polyglycolide (PGA), D-lactide, D, L-lactide, L-lactide, D, L-lactide-epsilon-caprolactone, D, L-lactide-glycolide-epsilon-caprolactone, polyepsilon-caprolactone, glycolide-caprolactone or combinations thereof, carboxymethyl cellulose, cellulose acetate, cellulose acetate propionate, ethyl cellulose, hydroxypropyl methyl cellulose, hydroxyalkyl methyl celluloses, and alkyl celluloses, polydimethylsiloxane, polyethylene-co-(vinyl acetate), poloxamer, polyvinylpyrrolidone, poloxamine, polypropylene, polyamide, polyacetal, polyester, poly ethylene-chlorotrifluoroethylene, polytetrafluoroethylene (PTFE or "Teflon™"), styrene butadiene rubber, polyethylene, polypropylene, polyphenylene oxide-polystyrene, poly-alpha-chloro-p-xylene, polymethylpentene, polysulfone, non-degradable ethylene-vinyl acetate (e.g., ethylene vinyl acetate disks and poly(ethylene-co-vinyl acetate)), poly(N-isopropylacrylamide), delrin, polyurethane, copolymers of silicone and polyurethane, polyolefins (such as polyisobutylene and polyisoprene), acrylamides (such as polyacrylic acid and poly(acrylonitrile-acrylic acid)), neoprene, nitrile, acrylates (such as polyacrylates, poly(2-hydroxy ethyl methacrylate), methacrylates, methyl methacrylate, 2-hydroxyethyl methacrylate, and copolymers of acrylates with N-vinyl pyrrolidone), N-vinyl lactams, polyacrylonitrile, glucomannan gel, vulcanized rubber, poly(3-hydroxybutyrate) and combinations thereof.

45. The mattress of paragraphs 39 through 44, wherein the polyethylene is closed cell low density polyethylene foam.

46. The mattress of paragraphs 39 through 45, wherein the upper, lower and middle substrates are independently selected from: a food grade polymer, food grade polylactic acid, or a food grade low density polyethylene (LDPE) according to FDA guidelines.

47. The mattress of paragraphs 39 and 43 through 46, further comprising a second corrugated product adhered to the top or bottom substrate wherein the second corrugated product comprises a second upper substrate, a second lower substrate and a second middle substrate corrugated between the second upper and lower substrates and two side perimeter pieces and two end perimeter pieces.

48. The mattress of paragraphs 39 and 43 through 47, wherein the second corrugated product is adhered to the first corrugated product using heat or adhesive.

49. The mattress of paragraphs 39 and 43 through 48, wherein the second corrugated product is made from substrates that are thinner and more resilient than providing a more cushion-like feel than the substrates used to make the first corrugated product.

50. The mattress of paragraphs 39 and 43 through 49, wherein the second upper, second middle and second lower substrates independently comprise:

polyethylene derivatives, polylactic acid derivatives, cellulose derivatives, silicon and silicon-based polymers and methacrylates.

51. The mattress of paragraphs 39 and 43 through 50, wherein the second upper, second middle and second lower substrates independently comprise: poly(lactide-co-glycolide) (PLGA), polylactide (PLA), polyglycolide (PGA), D-lactide, D, L-lactide, L-lactide, D, L-lactide-epsilon-caprolactone, D, L-lactide-glycolide-epsilon-caprolactone, polyepsilon-caprolactone, glycolide-caprolactone or combinations thereof, carboxymethyl cellulose, cellulose acetate, cellulose acetate propionate, ethyl cellulose, hydroxypropyl methyl cellulose, hydroxyalkyl methyl celluloses, and alkyl celluloses, polydimethylsiloxane, polyethylene-co-(vinyl acetate), poloxamer, polyvinylpyrrolidone, poloxamine, polypropylene, polyamide, polyacetal, polyester, poly ethylene-chlorotrifluoroethylene, polytetrafluoroethylene (PTFE or "Teflon™"), styrene butadiene rubber, polyethylene, polypropylene, polyphenylene oxide-polystyrene, poly-alpha-chloro-p-xylene, polymethylpentene, polysulfone, non-degradable ethylene-vinyl acetate (e.g., ethylene vinyl acetate disks and poly(ethylene-co-vinyl acetate)), poly(N-isopropylacrylamide), delrin, polyurethane, copolymers of silicone and polyurethane, polyolefins (such as polyisobutylene and polyisoprene), acrylamides (such as polyacrylic acid and poly(acrylonitrile-acrylic acid)), neoprene, nitrile, acrylates (such as polyacrylates, poly(2-hydroxy ethyl methacrylate), methacrylates, methyl methacrylate, 2-hydroxyethyl methacrylate, and copolymers of acrylates with N-vinyl pyrrolidone), N-vinyl lactams, polyacrylonitrile, glucomannan gel, vulcanized rubber, poly(3-hydroxybutyrate) and combinations thereof.

52. The mattress of paragraphs 39 and 43 through 51, wherein the polyethylene is closed cell low density polyethylene foam.

53. The mattress of paragraphs 39 and 43 through 52, wherein the second upper, second lower and second middle substrates are independently selected from: a food grade polymer, food grade polylactic acid, or a food grade low density polyethylene (LDPE) according to FDA guidelines.

54. The mattress of paragraphs 39 through 53 further comprising: two side perimeter pieces; and two end perimeter pieces wherein the two side pieces are fixed to the sides of the corrugated foam product and the two end pieces are fixed to the ends of the foam product to enclose the interior of the mattress.

55. A method of making a foam mattress comprising a first corrugated product including:

preparing a single wall foam corrugated product having an upper substrate, a middle substrate and a lower substrate, wherein the middle substrate is fluted and the flutes of the middle substrate are attached to the upper and lower substrates to make a foam mattress.

56. The method of paragraph 55 further including attaching foam perimeter pieces around the outside of foam mattress.

57. The method of paragraph 55 further comprising wrapping the enclosed corrugated product with a layer of cotton, densified polyester or polypropylene.

58. The method of paragraphs 55 through 57 further including a flame barrier on top of the cotton, densified polyester or polypropylene layer.

59. The method of paragraphs 55 through 58, further including an outer layer on top of the flame barrier.

60. The method of paragraphs 55 through 59, wherein the upper, middle and lower substrates independently comprise:

polyethylene derivatives, polylactic acid derivatives, cellulose derivatives, silicon and silicon-based polymers and methacrylates.

61. The method of paragraphs 55 through 60, wherein the upper, middle and lower substrates independently comprise:

poly(lactide-co-glycolide) (PLGA), polylactide (PLA), polyglycolide (PGA), D-lactide, D, L-lactide, L-lactide, D, L-lactide-epsilon-caprolactone, D, L-lactide-glycolide-epsilon-caprolactone, polyepsilon-caprolactone, glycolide-caprolactone or combinations thereof, carboxymethyl cellulose, cellulose acetate, cellulose acetate propionate, ethyl cellulose, hydroxypropyl methyl cellulose, hydroxyalkyl methyl celluloses, and alkyl celluloses, polydimethylsiloxane, polyethylene-co-(vinyl acetate), poloxamer, polyvinylpyrrolidone, poloxamine, polypropylene, polyamide, polyacetal, polyester, poly ethylene-chlorotrifluoroethylene, polytetrafluoroethylene (PTFE or "Teflon™"), styrene butadiene rubber, polyethylene, polypropylene, polyphenylene oxide-polystyrene, poly-alpha-chloro-p-xylene, polymethylpentene, polysulfone, non-degradable ethylene-vinyl acetate (e.g., ethylene vinyl acetate disks and poly(ethylene-co-vinyl acetate)), poly(N-isopropylacrylamide), delrin, polyurethane, copolymers of silicone and polyurethane, polyolefins (such as polyisobutylene and polyisoprene), acrylamides (such as polyacrylic acid and poly(acrylonitrile-acrylic acid)), neoprene, nitrile, acrylates (such as polyacrylates, poly(2-hydroxy ethyl methacrylate), methacrylates, methyl methacrylate, 2-hydroxyethyl methacrylate, and copolymers of acrylates with N-vinyl pyrrolidone), N-vinyl lactams, polyacrylonitrile, glucomannan gel, vulcanized rubber, poly (3-hydroxybutyrate) and combinations thereof.

62. The method of paragraph 55 through 61, wherein the polyethylene is closed cell low density polyethylene foam.

63. The method of paragraphs 55 through 62, wherein the upper, lower and middle substrates are independently selected from: a food grade polymer, food grade polylactic acid, or a food grade low density polyethylene (LDPE) according to FDA guidelines.

64. The method of paragraphs 55 through 63, wherein attaching is accomplished using an adhesive, a solvent suitable to partially dissolve the substrates, infrared heat, heat, laser or ultrasonic welding.

65. The mattress of paragraphs 55 and 58 through 64, further comprising a second corrugated product adhered to the top or bottom substrate wherein the second corrugated product comprises a second upper substrate, a second lower substrate and a second middle substrate corrugated between the second upper and lower substrates and two side perimeter pieces and two end perimeter pieces.

66. The mattress of paragraphs 55 and 58 through 65, wherein the second corrugated product is adhered to the first corrugated product using heat or adhesive.

67. The mattress of paragraphs 55 and 58 through 66, wherein the second corrugated product is made from substrates that are thinner and more resilient than providing a more cushion-like feel than the substrates used to make the first corrugated product.

68. the mattress of paragraphs 55 and 58 through 67, wherein the second upper, second middle and second lower substrates independently comprise:

polyethylene derivatives, polylactic acid derivatives, cellulose derivatives, silicon and silicon-based polymers and methacrylates.

69. The mattress of paragraphs 55 and 58 through 68, wherein the second upper, second middle and second lower substrates independently comprise:

poly(lactide-co-glycolide) (PLGA), polylactide (PLA), polyglycolide (PGA), D-lactide, D, L-lactide, L-lactide, D, L-lactide-epsilon-caprolactone, D, L-lactide-glycolide-epsilon-caprolactone, polyepsilon-caprolactone, glycolide-caprolactone or combinations thereof, carboxymethyl cellulose, cellulose acetate, cellulose acetate propionate, ethyl cellulose, hydroxypropyl methyl cellulose, hydroxyalkyl methyl celluloses, and alkyl celluloses, polydimethylsiloxane, polyethylene-co-(vinyl acetate), poloxamer, polyvinylpyrrolidone, poloxamine, polypropylene, polyamide, polyacetal, polyester, poly ethylene-chlorotrifluoroethylene, polytetrafluoroethylene (PTFE or "Teflon™"), styrene butadiene rubber, polyethylene, polypropylene, polyphenylene oxide-polystyrene, poly-alpha-chloro-p-xylene, polymethylpentene, polysulfone, non-degradable ethylene-vinyl acetate (e.g., ethylene vinyl acetate disks and poly(ethylene-co-vinyl acetate)), poly(N-isopropylacrylamide), delrin, polyurethane, copolymers of silicone and polyurethane, polyolefins (such as polyisobutylene and polyisoprene), acrylamides (such as polyacrylic acid and poly(acrylonitrile-acrylic acid)), neoprene, nitrile, acrylates (such as polyacrylates, poly(2-hydroxy ethyl methacrylate), methacrylates, methyl methacrylate, 2-hydroxyethyl methacrylate, and copolymers of acrylates with N-vinyl pyrrolidone), N-vinyl lactams, polyacrylonitrile, glucomannan gel, vulcanized rubber, poly (3-hydroxybutyrate) and combinations thereof.

70. The mattress of paragraphs 55 and 58 through 69 wherein the polyethylene is closed cell low density polyethylene foam.

71. The mattress of paragraphs 55 and 58 through 70, wherein the second upper, second lower and second middle substrates are independently selected from: Polylactic Acid which has been FDA as a Food Grade Polymer or a Food Grade low density polyethylene (LDPE) that meets FDA guidelines.

72. A mattress cover, the mattress cover comprising a laminated foam covering at least one surface of the mattress.

73. The mattress cover of paragraph 72, wherein the foam comprises, polyurethane, polyethylene, polyester, polypropylene or polylactic acid.

74. The mattress cover of paragraphs 72 through 73, wherein the foam is about 1/32 to 1/8 inch thick.

75. The mattress cover of paragraphs 72 through 74, wherein the laminate is a film of polyurethane, polyethylene, polyester, polypropylene or polylactic acid.

76. The mattress cover of paragraphs 72 through 75, wherein the cover is bonded to the sides of the mattress.

77. The mattress cover of paragraphs 72 through 76, wherein the cover envelops the mattress to contain it having an open end to accept the mattress.

While this invention has been described in conjunction with the various exemplary embodiments outlined above, various alternatives, modifications, variations, improvements and/or substantial equivalents, whether known or that are or may be presently unforeseen, may become apparent to those having at least ordinary skill in the art. Accordingly, the exemplary embodiments according to this invention, as set forth above, are intended to be illustrative not limiting. various changes may be made without departing from the spirit and scope of the invention. therefore, the invention is intended to embrace all known or later-developed alternatives, modifications, variations, improvements and/or substantial equivalents of these exemplary embodiments.

What is claimed is:

1. An apparatus to prepare a corrugated product, comprising:
   (a) a first pair of drive rollers to drive a middle substrate, actuated to have a velocity $V_3$;
   (b) a form guide; wherein the form guide provides an upper surface to guide an upper substrate and a lower surface to guide a lower substrate;
   (c) a second pair of drive rollers actuated to have a velocity $V_1$;
   (d) wherein $V_3$ is greater than $V_1$ and the first pair of drive rollers is configured to drive the middle substrate into a space delimited by the form guide such that the middle substrate buckles and alternately contacts the upper and lower substrates;
   (e) a bonding device positioned about the upper surface and the lower surface of the form guide, wherein the bonding device attaches the middle substrate to the upper and lower substrates;
   wherein a corrugated product is prepared.

2. The apparatus of claim 1, wherein the form guide is a set of substantially parallel plates, parallel rollers or a combination thereof.

3. The apparatus of claim 1, further comprising a feed guide, wherein the feed guide comprises two plates separated by a distance that can be varied to accept the middle substrate.

4. The apparatus of claim 1, wherein the bonding device is a heater, a solvent applicator, a sonic welder, a laser welder or an adhesive applicator bonding the flutes of the middle substrate with the upper and lower substrates.

5. The apparatus of any of claim 1, further comprising a cutting apparatus.

6. The apparatus of claim 1, further comprising one or more guide rollers to guide the upper substrate into the form guide and the lower substrate into the form guide.

7. The apparatus of claim 1, wherein the second pair of drive rollers is situated in the apparatus after the corrugated product exits the form guide.

8. The apparatus of claim 1, wherein the second pair of drive rollers is located before the form guide and drives only the upper substrate.

9. The apparatus of claim 1, wherein a third set of drive rollers is located before the form guide and drives only the lower substrate at a velocity $V_2$.

10. The apparatus of claim 1, wherein the drive rollers are actuated together.

11. The apparatus of claim 1, wherein the drive rollers are actuated independently.

12. The apparatus of claim 1, further comprising a feed guide, wherein the feed guide comprises two plates separated by a distance that can be varied to accept the upper substrate.

13. The apparatus of claim 1, further comprising a feed guide, wherein the feed guide comprises two plates separated by a distance that can be varied to accept the lower substrate.

14. The apparatus of claim 1, further comprising three feed guides, wherein each feed guide comprises two plates separated by a distance that can be varied to accept the lower substrate, the upper substrate and the middle substrate.

15. An apparatus to prepare a corrugated article, comprising:
    (a) a first pair of drive rollers to move a middle substrate at a rate $V_3$ through the feed guide;
    (b) a form guide, comprising an upper and a lower surface separated by a distance $S_1$, wherein the form guide accepts an upper substrate on its upper surface and a lower substrate on its lower surface and the middle substrate from the drive rollers, wherein the first pair of drive rollers is configured to drive the middle substrate into a space delimited by the distance $S_1$ of the form guide such that the middle substrate buckles and alternately contacts the upper and lower substrates;
    (c) a bonding device positioned about the upper surface and the lower surface of the form guide, wherein the bonding device attaches flutes of the middle substrate to the upper and lower substrates to provide a corrugated product;
    (d) a second pair of drive rollers positioned after the form guide and pulls the corrugated product through the apparatus;
    wherein a corrugated article is produced.

16. The apparatus of claim 15, wherein the form guide is a set of substantially parallel plates, parallel rollers or combinations thereof.

17. The apparatus of claim 15, further including a feed guide, wherein the feed guide comprises two plates separated by a distance that can be varied to accept the middle substrate from the drive rollers.

18. The apparatus of claim 15, wherein the bonding device is a heater, a solvent applicator, a sonic welder, a laser welder or an adhesive applicator bonding the flutes of the middle substrate with the upper and lower substrates.

19. The apparatus of claim 15, further comprising a cutting apparatus.

* * * * *